(12) United States Patent
Maaninen

(10) Patent No.: US 11,317,101 B2
(45) Date of Patent: Apr. 26, 2022

(54) INTER FRAME CANDIDATE SELECTION FOR A VIDEO ENCODER

(71) Applicant: Google Inc., Mountain View, CA (US)

(72) Inventor: Juha Pekka Maaninen, Oulu (FI)

( * ) Notice: Subject to any disclaimer, the term of this patent is extended or adjusted under 35 U.S.C. 154(b) by 1753 days.

(21) Appl. No.: 14/921,378

(22) Filed: Oct. 23, 2015

(65) Prior Publication Data

US 2016/0044332 A1 Feb. 11, 2016

Related U.S. Application Data

(63) Continuation-in-part of application No. 13/494,961, filed on Jun. 12, 2012, now Pat. No. 9,172,970.

(51) Int. Cl.
*H04N 19/176* (2014.01)
*H04N 19/513* (2014.01)
(Continued)

(52) U.S. Cl.
CPC ......... *H04N 19/176* (2014.11); *H04N 19/105* (2014.11); *H04N 19/107* (2014.11);
(Continued)

(58) Field of Classification Search
CPC .. H04N 19/176; H04N 19/105; H04N 19/107; H04N 19/109; H04N 19/154; H04N 19/436; H04N 19/513
(Continued)

(56) References Cited

U.S. PATENT DOCUMENTS

| | | |
|---|---|---|
| 4,924,310 A | 5/1990 | von Brandt |
| 5,148,269 A | 9/1992 | de Haan et al. |

(Continued)

FOREIGN PATENT DOCUMENTS

| | | |
|---|---|---|
| EP | 0634873 A2 | 1/1995 |
| EP | 0979011 A1 | 2/2000 |

(Continued)

OTHER PUBLICATIONS

Bankoski et al. "Technical Overview of VP8, An Open Source Video Codec for the Web". Dated Jul. 11, 2011.

(Continued)

*Primary Examiner* — Joseph G Ustaris
*Assistant Examiner* — Jimmy S Lee
(74) *Attorney, Agent, or Firm* — Young Basile Hanlon & MacFarlane, P.C.

(57) ABSTRACT

Inter frame candidate selection may include identifying a current block from a current input frame from an input video stream, and generating an encoded block by encoding the current block, wherein encoding the current block includes determining an inter-coding candidate motion vector. Determining the inter-coding candidate motion vector may include identifying a plurality of motion vectors, wherein the plurality of motion vectors includes a context motion vector identified from a block neighboring the current block in the current input frame, a zero valued motion vector, and an estimated motion vector based on the current block and a reference frame, determining a plurality of cost values by determining a cost value for each respective motion vector from the plurality of motion vectors, and identifying a motion vector from the plurality of motion vectors having a minimal cost value as the inter-coding candidate motion vector.

20 Claims, 12 Drawing Sheets

(51) Int. Cl.
  *H04N 19/154* (2014.01)
  *H04N 19/436* (2014.01)
  *H04N 19/107* (2014.01)
  *H04N 19/105* (2014.01)
  *H04N 19/109* (2014.01)

(52) U.S. Cl.
  CPC ......... *H04N 19/109* (2014.11); *H04N 19/154* (2014.11); *H04N 19/436* (2014.11); *H04N 19/513* (2014.11)

(58) Field of Classification Search
  USPC .................................................. 375/240.16
  See application file for complete search history.

(56) References Cited

U.S. PATENT DOCUMENTS

| | | | |
|---|---|---|---|
| 5,337,086 A | 8/1994 | Fujinami | |
| 5,398,068 A | 3/1995 | Liu et al. | |
| 5,461,708 A | 10/1995 | Kahn | |
| 5,512,952 A | 4/1996 | Iwamura | |
| 5,550,964 A | 8/1996 | Davoust | |
| 5,581,678 A | 12/1996 | Kahn | |
| 5,610,658 A | 3/1997 | Uchida et al. | |
| 5,611,034 A | 3/1997 | Makita | |
| 5,729,690 A | 3/1998 | Jeong et al. | |
| 5,731,840 A | 3/1998 | Kikuchi et al. | |
| 5,742,710 A | 4/1998 | Hsu et al. | |
| 5,886,742 A | 3/1999 | Hibi et al. | |
| 5,905,535 A | 5/1999 | Kerdranvat | |
| 5,978,030 A | 11/1999 | Jung et al. | |
| 5,987,180 A | 11/1999 | Reitmeier | |
| 5,991,447 A | 11/1999 | Eifrig et al. | |
| 6,005,980 A | 12/1999 | Eifrig et al. | |
| 6,011,870 A | 1/2000 | Jeng et al. | |
| 6,014,181 A | 1/2000 | Sun | |
| 6,058,143 A | 5/2000 | Golin | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,473,460 B1 | 10/2002 | Topper | |
| 6,507,617 B1 | 1/2003 | Karczewicz et al. | |
| 6,711,211 B1 | 3/2004 | Lainema | |
| 6,735,249 B1 | 5/2004 | Karczewicz et al. | |
| 6,876,702 B1 | 4/2005 | Hui et al. | |
| 6,912,255 B2 | 6/2005 | Drezner et al. | |
| 7,002,580 B1 | 2/2006 | Aggala et al. | |
| 7,418,147 B2 | 8/2008 | Kamaci et al. | |
| 7,463,685 B1 | 12/2008 | Haskell et al. | |
| 7,580,456 B2 | 8/2009 | Li et al. | |
| 7,581,168 B2 | 8/2009 | Boon | |
| 7,606,310 B1 | 10/2009 | Ameres et al. | |
| 7,705,847 B2 | 4/2010 | Helfman et al. | |
| 7,978,770 B2 | 7/2011 | Luo et al. | |
| 8,005,144 B2 | 8/2011 | Ji et al. | |
| 8,006,194 B2 | 8/2011 | Berger et al. | |
| 8,130,840 B2 | 3/2012 | Mishima et al. | |
| 8,208,540 B2 | 6/2012 | Cote | |
| 8,345,758 B2 | 1/2013 | Jeon | |
| 8,351,505 B2 | 1/2013 | Jeon | |
| 8,442,117 B2 | 5/2013 | Lee et al. | |
| 8,451,904 B2 | 5/2013 | Reznik et al. | |
| 8,559,512 B2 | 10/2013 | Paz | |
| 8,594,200 B2 | 11/2013 | Chang et al. | |
| 8,718,144 B2 | 5/2014 | Reznik et al. | |
| 8,762,441 B2 | 6/2014 | Reznik | |
| 8,787,459 B2 | 7/2014 | Wang | |
| 8,818,114 B2 | 8/2014 | Kim et al. | |
| 8,867,618 B2 | 10/2014 | Pandit et al. | |
| 8,879,634 B2 | 11/2014 | Reznik | |
| 8,885,956 B2 | 11/2014 | Sato | |
| 8,891,626 B1 | 11/2014 | Bankoski et al. | |
| 8,908,767 B1 | 12/2014 | Holmer | |
| 9,094,689 B2 | 7/2015 | Yu et al. | |
| 9,172,971 B2 | 10/2015 | Wahadaniah et al. | |
| 2002/0031272 A1 | 3/2002 | Bagni et al. | |
| 2002/0064228 A1 | 5/2002 | Sethuraman et al. | |
| 2002/0118754 A1 | 8/2002 | Choi | |
| 2003/0072374 A1 | 4/2003 | Sohm | |
| 2003/0202594 A1* | 10/2003 | Lainema | H04N 19/176 375/240.16 |
| 2004/0001546 A1 | 1/2004 | Tourapis et al. | |
| 2004/0028131 A1 | 2/2004 | Ye et al. | |
| 2004/0066848 A1 | 4/2004 | Jeon | |
| 2004/0218674 A1 | 11/2004 | Kondo et al. | |
| 2004/0258155 A1 | 12/2004 | Lainema et al. | |
| 2005/0117646 A1 | 6/2005 | Joch et al. | |
| 2005/0123282 A1 | 6/2005 | Novotny et al. | |
| 2005/0129122 A1* | 6/2005 | Booth | H04N 19/557 375/240.16 |
| 2005/0226333 A1 | 10/2005 | Suzuki et al. | |
| 2005/0243925 A1 | 11/2005 | Bottreau | |
| 2005/0243926 A1 | 11/2005 | Hubrich et al. | |
| 2005/0254719 A1 | 11/2005 | Sullivan | |
| 2005/0276326 A1* | 12/2005 | Drezner | H04N 19/176 375/240.12 |
| 2006/0114989 A1 | 6/2006 | Panda | |
| 2006/0209961 A1 | 9/2006 | Han et al. | |
| 2006/0233254 A1 | 10/2006 | Lee et al. | |
| 2006/0268166 A1 | 11/2006 | Bossen et al. | |
| 2006/0294171 A1 | 12/2006 | Bossen et al. | |
| 2007/0014358 A1 | 1/2007 | Tourapis et al. | |
| 2007/0019729 A1* | 1/2007 | Nakagomi | H04N 7/5086 375/240.13 |
| 2007/0110156 A1 | 5/2007 | Ji et al. | |
| 2007/0195881 A1 | 8/2007 | Hagiya | |
| 2007/0286280 A1 | 12/2007 | Saigo et al. | |
| 2008/0025390 A1 | 1/2008 | Shi et al. | |
| 2008/0037639 A1 | 2/2008 | Jeon | |
| 2008/0043845 A1 | 2/2008 | Nakaishi | |
| 2008/0056354 A1 | 3/2008 | Sun et al. | |
| 2008/0084931 A1 | 4/2008 | Kondo et al. | |
| 2008/0111722 A1 | 5/2008 | Reznik | |
| 2008/0159392 A1 | 7/2008 | Chiang et al. | |
| 2008/0165855 A1 | 7/2008 | Wang et al. | |
| 2008/0212676 A1* | 9/2008 | Liu | H04N 19/56 375/240.16 |
| 2008/0240242 A1 | 10/2008 | Lainema | |
| 2008/0243971 A1* | 10/2008 | Po | H04N 19/176 708/4 |
| 2008/0253459 A1 | 10/2008 | Ugur et al. | |
| 2008/0291285 A1 | 11/2008 | Shimizu | |
| 2008/0310514 A1 | 12/2008 | Osamoto et al. | |
| 2008/0317127 A1 | 12/2008 | Lee et al. | |
| 2009/0016439 A1 | 1/2009 | Thoreau et al. | |
| 2009/0067497 A1 | 3/2009 | Jeon | |
| 2009/0074062 A1 | 3/2009 | Jeon | |
| 2009/0074067 A1 | 3/2009 | Jeon | |
| 2009/0110077 A1 | 4/2009 | Amano et al. | |
| 2009/0125538 A1 | 5/2009 | Rosenzweig et al. | |
| 2009/0129474 A1 | 5/2009 | Pandit et al. | |
| 2009/0290643 A1 | 11/2009 | Yang | |
| 2010/0079624 A1 | 4/2010 | Miyasako | |
| 2010/0284469 A1 | 11/2010 | Sato et al. | |
| 2010/0322301 A1 | 12/2010 | Karkkainen | |
| 2011/0026820 A1 | 2/2011 | Strom et al. | |
| 2011/0096837 A1 | 4/2011 | Demos | |
| 2011/0110428 A1 | 5/2011 | Chang et al. | |
| 2011/0158319 A1* | 6/2011 | Bae | H04N 19/176 375/240.16 |
| 2011/0170597 A1 | 7/2011 | Shi et al. | |
| 2011/0170602 A1 | 7/2011 | Lee et al. | |
| 2011/0188583 A1 | 8/2011 | Toraichi et al. | |
| 2011/0243229 A1 | 10/2011 | Kim et al. | |
| 2011/0261886 A1 | 10/2011 | Suzuki et al. | |
| 2011/0274170 A1 | 11/2011 | Paz | |
| 2011/0293010 A1 | 12/2011 | Jeong et al. | |
| 2012/0014440 A1 | 1/2012 | Segall et al. | |
| 2012/0075535 A1 | 3/2012 | Van Beek | |
| 2012/0082213 A1* | 4/2012 | Sekiguchi | H04N 19/186 375/240.02 |
| 2012/0134415 A1 | 5/2012 | Lin et al. | |

(56) References Cited

U.S. PATENT DOCUMENTS

| | | | |
|---|---|---|---|
| 2012/0236931 A1* | 9/2012 | Karczewicz | H04N 19/132 |
| | | | 375/240.02 |
| 2012/0263231 A1 | 10/2012 | Zhou | |
| 2012/0294363 A1 | 11/2012 | Lee et al. | |
| 2012/0300845 A1 | 11/2012 | Endresen et al. | |
| 2012/0307905 A1 | 12/2012 | Kim et al. | |
| 2013/0003851 A1 | 1/2013 | Yu et al. | |
| 2013/0022127 A1 | 1/2013 | Park et al. | |
| 2013/0027230 A1 | 1/2013 | Marpe et al. | |
| 2013/0089149 A1 | 4/2013 | Hayashi et al. | |
| 2013/0089266 A1 | 4/2013 | Yang et al. | |
| 2013/0114725 A1 | 5/2013 | Lou et al. | |
| 2013/0208795 A1 | 8/2013 | Xu et al. | |
| 2014/0092975 A1 | 4/2014 | Yu et al. | |
| 2014/0098877 A1 | 4/2014 | Xu et al. | |
| 2015/0055706 A1 | 2/2015 | Xu et al. | |

FOREIGN PATENT DOCUMENTS

| | | |
|---|---|---|
| EP | 1091592 A2 | 4/2001 |
| EP | 1158806 A1 | 11/2001 |
| EP | 1672926 A1 | 6/2006 |
| EP | 2536146 A2 | 12/2012 |
| GB | 2477033 A | 7/2011 |
| WO | 9941912 A2 | 8/1999 |
| WO | 2010086041 A1 | 8/2010 |
| WO | 2012125178 A1 | 9/2012 |
| WO | 2013036071 A2 | 3/2013 |
| WO | 2013039639 A1 | 3/2013 |
| WO | 2013042888 A2 | 3/2013 |
| WO | 2013109953 A1 | 7/2013 |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bossen, F., "Common test Conditions and Software Reference Configurations," Joint Collaborative Team on Video Coding, JCTVC-D600, Jan. 2011.

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, 8 Sep. 2011, all pages.

Cassidy, Sean, An Analysis of VP8, a New Video Codec for the Web, Nov. 2011, Rochester Institute of Technology, Rochester NY.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi, Touradj, et al.; "Joint motion estimation and segmentation for very low bitrate video coding", SPIE vol. 2501, 1995, 12 pp.

European Office Action for EP12737396.7 dated Oct. 30, 2015, 7 pages.

Guillotel, Philippe, et al.; "Comparison of motion vector coding techniques", SPIE vol. 2308, 1994, 11 pp.

Hong D et al.: "Scalabilty Support in HEVC", 97, MPEG Meeting; Jul. 18, 2011-Jul. 22, 2011; Torino; (Motion Picture Expert Group or ISO/IEC JTC1/SC29/WG11 ),JCTVCF290, Jul. 13, 2011, all pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Jeon, Y et al.: "Non-CE9: improvement on parallelized merge/skip mode", No. JCTVC-G164, Nov. 8, 2011. 7 pages.

Jianghong Guo et al., A Novel Criterion for Block Matching Motion Estimation, October 123, 1998, IEEE, vol. 1 pp. 841-844.

Kang J W et al.: "Description of Scalable video coding technoloogy proposal by ETRI and Kwangwoon Univ", 11, JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG16); URL: http://wflp3.itu.int/av-arch/jctvc-site/. No. JCTVC-K0037, Oct. 1, 2012, all pages.

Karcxewicz (Qualcomm) M et al., "Video coding technology proposal by Qualcomm," 1. JCT-VC Meeting;; Apr. 15, 2010-Apr. 23, 2010; Dresden; (Joint Collaborative Team on Video Coding of ISO/IEC JTC1/SC29/WG11 and ITU-T SG16); URL: http://wftp3.itu.int/av-arch/jctve-site/, Apr. 16, 2010 (Apr. 16, 2010), XP030007586, ISSN:0000-0049.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp. (Abstract only).

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Lou J et al., "CE:3: Fixed interpolation filter tests by Motorla Mobility," 6. JCT-VC Meeting; 97. Mpeg Meeting Jul. 14, 2011-Jul. 22, 2011; Torino; (Joint Collaborative Team on Video Coding of ISO/IEC JTC1/SC29/WG11 and ITU-T SG16); URL: http://wftp3.itu.int/av-arch/jctve-site/. No. JCTVC-F574, Jul. 3, 2011 (Jul. 3, 2011), XP030009597.

Lou J et al., "Motion Vector Scaling for non-uniform interpolation offset," 7. JCT-VC Meeting; 98. Mpeg Meeting; Nov. 21, 2011-Nov. 30, 2011; Geneva; (Joint Collaborative Team on Video Coding of ISO/IEC JTC1/SC29/WG11 and ITU-T SG16); URL: http://wftp3.itu.int/av-arch/jctve-site/. No. JCTVC-G699, Nov. 9, 2011(Nov. 9, 2011), XP030110683.

Luttrell. Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

McCann et al., "Video Coding Technology Proposal by Samsung(and BBC)," Joint Collaborative Team on Video Coding, 1st Meeting, Dresden, Germany, JCTVC-24, Apr. 15-23, 2010.

Mozilla, "Introduction to Video Coding Part 1: Transform Coding", Video Compression Overview, Mar. 2012, 171 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Qiang, Peng, T. Yang, and C Zhu, Block-based temporal error concealment for video packet using motion vector extrapolation',

(56) References Cited

OTHER PUBLICATIONS

2002 International Conference on Communications, Circuits and Systems and West Sino Exposition Proceedings, 10-14 vol. 1:2.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.

VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al., "WD3: Working Draft 3 of High-Efficiency Video Coding," 20110329 JCTVC-E603, Mar. 29, 2011, all pages.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
Zheng et al., "Extended Motion Vector Prediction for Bi Predictive Mode," Joint Collaborative Team on Video Coding Geneva, JCTVC-E343, Mar. 2011.
Zheng, Y et al., Unified Motion Vector Predictor Selection for merge and AMVP, Mar. 2011.
International Search Report and Written Opinion for related application PCT/US2013/063723, dated Feb. 2, 2012.
Aroche G. et al.: "RD Optimized Coding for Motion Vector Predictor Selection", IEEE Transactions on Circuits and Systems for Video Technology, vol. 18, No. 9, Sep. 1, 2008.
Li S et al.: "Direct Mode Coding for Bipredictive Slices in the H.264 Standard", IEEE Transations on Circuits and Systems for Video Technology, vol. 15, Jan. 1, 2005.
Steffen Kamp et al.: "Decoder side motion vector derivation for inter frame video coding" Image Processing, 2008, 15th IEEE International Conference, Oct. 12, 2008.
Steffen Kamp et al.: "Improving AVC Compression performance by template matching with decoder-side motion vector derivation", 84. MPEG Meeting; Feb. 5, 2008.
Ueda M et al.: "TE1: Refinement Motion Compensation using Decoder-side Motion Estimation" JCT-VC Meeting; Jul. 28, 2007.
Yi-Jen Chiu et al.: "Self-derivation of motion estimation techniques to improve video coding efficiency", Proceedings of SPIE, vol. 7798, Aug. 19, 2010.
Y-Jen Chiu et al.: "Fast Techniques to Improve Self Derivation of Motion Estimation" JCT-VC Meeting, Jul. 28, 2010.
Yue Wang et al.: "Advanced spatial and temporal direct mode for B picture coding", Visual Communications and Image Processing (VCIP), 2011 Ieee, Nov. 6, 2011, pp. 1-4.
Y-W Huang et al.: "Decoder-side Motion Vector Derivation with Switchable Template Matching" JCT-VC Meeting Jul. 28, 2010.

* cited by examiner

US 11,317,101 B2

INTER FRAME CANDIDATE SELECTION FOR A VIDEO ENCODER

CROSS-REFERENCE TO RELATED APPLICATION

This application is a continuation-in-part of U.S. patent application Ser. No. 13/494,961, filed on Jun. 12, 2012, the entire content of which is incorporated herein in its entirety by reference.

TECHNICAL FIELD

This disclosure relates generally to video processing, and more specifically, to selecting an inter frame candidate for encoding.

BACKGROUND

The amount of data representing media information, for example, a still image or a video image, can be extremely large. Further, transmitting digital video information over communication networks can consume large amounts of bandwidth. The cost of transmitting data from one location to another is a function of bit rate, e.g. the number of bits transmitted per second. Typically, higher bit transfer rates are associated with increased cost. Higher bit rates can also progressively increase the required storage capacities of memory systems, thereby increasing storage cost. Thus, for a given desired quality level, it can be more cost effective to use fewer bits than more bits to store digital images and videos. It is thus desirable to compress media data for recording, transmitting, or storing.

In a typical compression scheme, achieving higher media quality requires usage of more bits, which can increase the cost of transmission and storage. In other words, while lower bandwidth traffic is desired, so is higher quality media. Regarding compression, the devices encoder, decoder and codec are typically associated with compression. An encoder is a device capable of encoding (e.g., coding) (and sometimes decoding) digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Generally speaking, for example, codec classifications include discrete cosine transfer codecs, fractal codecs, and wavelet codecs. An encoder or codec, by encoding the digital media data, can reduce the number of bits required to transmit signals thereby reducing associated transmission costs.

The encoding process typically involves using motion estimation to facilitate encoding of digital media data. In most cases, consecutive video frames in a sequence of video frames are relatively similar to each other, except for small movements of location(s) of object(s) within a frame from one video frame to the next video frame. Motion estimation techniques take advantage of similarities between consecutive video frames to more efficiently encode a video frame. For instance, an encoder, employing a motion estimation technique, can use a previous video frame as a reference when encoding a current video frame. The encoder generates motion vectors for the current video frame based on its differences from the previous video frame. The encoder identifies differences between the reference video frame and current video frame, and only codes the portions of the current video frame that are different from the reference video frame, without coding the portions of the current video frame that are unchanged from the reference video frame. Selectively coding only the portions that are different makes the encoding and decoding processes more efficient. However, motion estimation is one of the most computing intensive parts of the video encoding process. The better the motion vector, the more the bit rate can be reduced and the more the visual quality can be improved.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a method of inter frame candidate selection may include identifying a current block from a current input frame from an input video stream, generating an encoded block by encoding the current block, wherein encoding the current block includes determining an inter-coding candidate motion vector, including the encoded block in an output bitstream, and storing or transmitting the output bitstream. Determining the inter-coding candidate motion vector may include identifying a plurality of motion vectors, wherein the plurality of motion vectors includes a context motion vector identified from a block neighboring the current block in the current input frame, a zero valued motion vector, and an estimated motion vector based on the current block and a reference frame, determining a plurality of cost values by determining a cost value for each respective motion vector from the plurality of motion vectors, and identifying a motion vector from the plurality of motion vectors having a minimal cost value as the inter-coding candidate motion vector. Determining the cost value for a motion vector from the plurality of motion vectors may include determining a distortion measurement for encoding the current block using the motion vector, determining an estimated encoding cost for encoding the current block using the motion vector, identifying a weighting value, and determining the cost value as a sum of the distortion measurement and a product of the weighting value and the estimated encoding cost.

Another aspect is a method for video coding using inter frame candidate selection. In some implementations, video coding using inter frame candidate selection may include identifying a current block from a current input frame from an input video stream, generating an encoded block by encoding the current block, wherein encoding the current block includes determining an inter-coding candidate motion vector, including the encoded block in an output bitstream, and storing or transmitting the output bitstream. Determining the inter-coding candidate motion vector may include identifying a plurality of motion vectors, wherein the plurality of motion vectors includes a context motion vector identified from a block neighboring the current block in the current input frame, a zero valued motion vector, and an estimated motion vector based on the current block and a reference frame, determining a plurality of cost values by determining a cost value for each respective motion vector from the plurality of motion vectors, and identifying a motion vector from the plurality of motion vectors having a minimal cost value as the inter-coding candidate motion vector. Determining the cost value for a motion vector from the plurality of motion vectors may include determining a predicted block based on the current block and the motion vector, determining a residual block as a difference between the current block and the predicted block, generating a transform block based on the residual block, generating a quantized block based on the transform block, determining an inverse-quantized block based on the quantized block, determining a sum of squared errors between the transform block and the inverse-quantized block as a distortion measurement for encoding the current block using the motion vector, identifying a defined scan order for the quantized block, wherein the quantized block includes a plurality of quantized transform coefficients, determining a plurality of estimated coefficient encoding costs by determining an estimated coefficient encoding cost for each respective quantized transform coefficient from the plurality of quantized transform coefficients, determining a sum of the plurality of estimated coefficient encoding costs as an estimated encoding cost for encoding the current block using the motion vector, identifying a weighting value, and determining the cost value as a sum of the distortion measurement and a product of the weighting value and the estimated encoding cost.

Another aspect is a method for video coding using inter frame candidate selection. In some implementations, video coding using inter frame candidate selection may include identifying a current block from a current input frame from an input video stream, generating an encoded block by encoding the current block, including the encoded block in an output bitstream, and storing or transmitting the output bitstream. Encoding the current block may include determining an inter-coding candidate motion vector, determining an intra-coding candidate motion vector, determining a first sum of absolute differences for the intra-coding candidate motion vector, determining a second sum of absolute differences for the inter-coding candidate motion vector, encoding the current block using the intra-coding candidate motion vector on a condition that the second sum of absolute differences exceeds the first sum of absolute differences, and encoding the current block using the inter-coding candidate motion vector on a condition that the first sum of absolute differences exceeds the second sum of absolute differences. Determining the inter-coding candidate motion vector may include identifying a plurality of motion vectors, wherein the plurality of motion vectors includes a context motion vector identified from a block neighboring the current block in the current input frame, a zero valued motion vector, and an estimated motion vector based on the current block and a reference frame, determining a plurality of cost values by determining a cost value for each respective motion vector from the plurality of motion vectors, and identifying a motion vector from the plurality of motion vectors having a minimal cost value as the inter-coding candidate motion vector. Determining the cost value for a motion vector from the plurality of motion vectors may include determining a distortion measurement for encoding the current block using the motion vector, determining an estimated encoding cost for encoding the current block using the motion vector, identifying a weighting value, and determining the cost value as a sum of the distortion measurement and a product of the weighting value and the estimated encoding cost.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
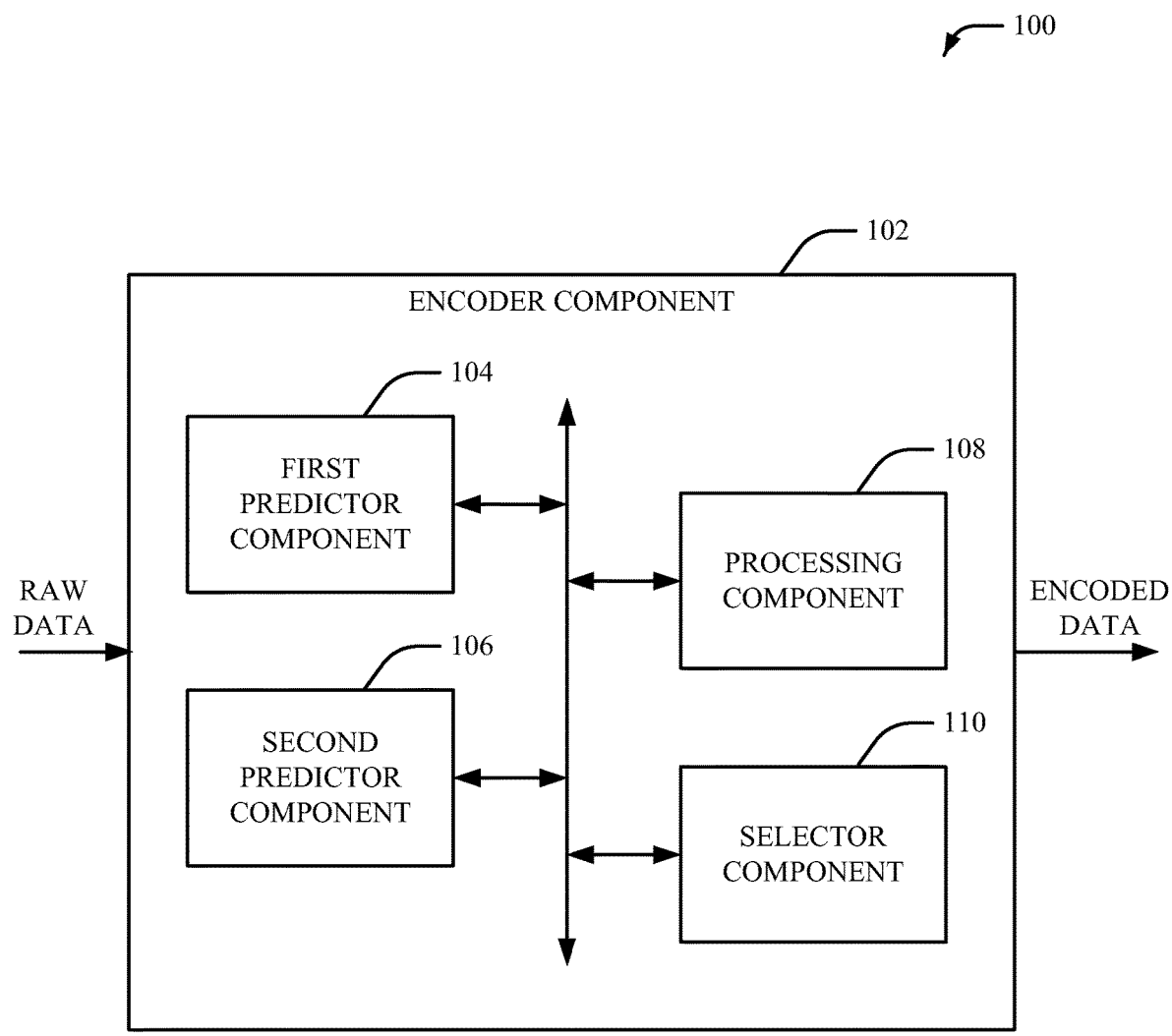
FIG. 1 illustrates a high-level block diagram of an example encoder component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of data representing media information can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be more cost effective to use fewer bits, as opposed to more bits, to store digital images and videos. It therefore can be desirable to compress media data for recording, transmitting, or storing.

Motion estimation is often used to facilitate encoding digital media data (e.g., video content). During the motion estimation process, motion vectors for a current raw video frame of a video frame sequence can be generated based on a reference video frame, which is typically a prior video frame in the sequence. Identifying the best motion vector can be useful to reduce bit rate and improve video quality. A best motion vector (e.g., a best candidate, a best motion vector mode) can be, for example, a motion vector (e.g., a candidate, a motion vector mode) that can produce the lowest bit rate for coding blocks of a video frame and/or provide the lowest rate-distortion (RD) cost.

Typically, there can be a number of factors involved in identifying the best motion vector. For example, residual data and/or the motion vector itself (e.g., motion vector difference) can be factors used to facilitate identifying the best motion vector. Generally, the smaller residual data is, the lower the bit rate, and the smaller the motion estimation difference is, the lower the bit rate. For residual data, the bit rate can be calculated, for example, by using a mean-square type algorithm or other desired algorithm. In some instances, the best motion vector can be selected as the motion vector having the smallest residual data. In certain other instances, the best motion vector can be selected as the motion vector having, for example, the smallest motion estimation difference.

However, conventional encoders may inefficiently encode motion vectors and/or may not encode the best motion vector for a current raw video frame. As a result, conventional encoding techniques may use an undesirable number of bits (e.g., may use more bits than necessary) to encode a block, which can undesirably increase the costs of transmission and storage of the video. Further, video quality may be undesirably (e.g., negatively) affected.

To that end, techniques for efficient encoding and decoding of video content are presented. Systems and methods disclosed herein relate to selecting an inter frame candidate (e.g., a motion vector for a macroblock, a motion vector mode, a prediction mode). The selection of an inter frame candidate is moved outside the motion estimation process (e.g., selection of an inter frame candidate is based on criteria that is different from criteria of the motion estimation process). For example, the selection of the inter frame candidate can be based on cost. Cost can be based at least in part on distortion measured by sum of square differences (SSD) (e.g., squared error per pixel) and rate measured by approximating the number of bits included in a bitstream (e.g., the number of bits generated into a control partition of the bitstream). All inter frame candidates can be processed in parallel, and the best inter frame candidate (e.g., the inter frame candidate with the lowest cost value) can be selected for encoding. Therefore, the best inter frame candidate can be selected after the motion estimation process is completed in an encoding pipeline. Accordingly, the amount of encoded media data can be reduced and/or compression efficiency of a video sequence can be increased.

Referring initially to FIG. 1, there is illustrated an example system 100 that can determine a best inter frame candidate for encoding, according to an aspect of this disclosure. The inter frame candidate can be a motion vector for a single macroblock. For example, the system 100 can calculate distortion for multiple motion vectors (e.g., multiple motion vector modes) in parallel. The distortion can be calculated using SSD calculation between prediction data and input data. Specifically, the system 100 can provide an encoder with a first predictor feature (e.g., first predictor component 104), a second predictor feature (e.g., second predictor component 106), a processing feature (e.g., processing component 108) and a selector feature (e.g., selector component 110). The first predictor feature can select one or more previous motion vectors for a current block. The one or more previous motion vectors can include, for example, a previously determined motion vector from a neighboring block in the current frame and/or a zero valued motion vector that predicts the current block from a corresponding block in a prediction frame. The second predictor feature can select an estimated motion vector, for example, based at least in part on a sum of absolute difference (SAD) calculation and/or a penalty value. The processing feature can calculate a cost value (e.g., a distortion value and/or a rate value) for each of the one or more previous motion vectors, the zero valued motion vector and/or the estimated motion vector based at least in part on a SSD calculation. The selector feature can select a motion vector with a lowest calculated cost value from the one or more previous motion vectors, the zero valued motion vector and/or the estimated motion vector as an inter frame candidate. Accordingly, improved compression efficiency can be achieved. The system 100 can be employed by various systems, such as, but not limited to, image and video capturing systems, media player systems, televisions, mobile phones, tablets, personal data assistants, gaming systems, computing devices, and the like. In one example, the system 100 is implemented on an application specific integrated chip (ASIC). In another example, the system 100 is implemented on a system on a chip (SOC). In yet another example, the system 100 can be implemented in specialized hardware (e.g., a specialized processor, a hardware accelerator, an application processor, etc.) that is separate from a central processing unit (CPU).

In particular, the system 100 can include an encoder component 102. In FIG. 1, the encoder component 102 includes the first predictor component 104, the second predictor component 106, the processing component 108 and the selector component 110. The encoder component 102 can receive one or more image frames (e.g., RAW DATA indicated in FIG. 1). In one example, the one or more image frames can be an input video signal represented as a series of video frames.

The first predictor component 104 can generate and/or select one or more previous motion vectors (e.g., previously determined motion vectors) for a current block. The one or more previous motion vectors can include a previously determined motion vector from a neighboring block in the current frame. For example, the one or more previous motion vectors can include a nearest motion vector and/or a near motion vector (e.g., different motion vector modes). The nearest motion vector (e.g., the nearest candidate) can be a last non-zero motion vector from a neighboring macroblock. The near motion vector (e.g., the near candidate) can be a second-to-last non-zero motion vector from a neighboring macroblock. Therefore, the one or more previous motion vectors can be different previously determined motion vectors from a neighboring macroblock in the current frame. Additionally, the one or more previous motion vectors can include a zero valued motion vector. The zero valued motion vector can predict the current block from a corresponding block in a prediction frame (e.g., the value of the zero valued motion vector is zero). The one or more previous motion vectors can be determined using motion vector encoding. In one example, the one or more previous motion vectors can be implemented as 16×16 motion vectors (e.g., 16×16 candidates). The nearest motion vector, the near motion vector and the zero valued motion vector can each represent a unique motion vector encoding mode (e.g., motion vector mode).

The second predictor component 106 can generate and/or select an estimated motion vector (e.g., a motion estimation result vector). The estimated motion vector can be determined based at least in part on a sum of absolute difference (SAD) calculation and/or a penalty value. The penalty value can be based on motion vector length. The estimated motion vector can be determined using motion estimation (e.g., the estimated motion vector can represent a motion vector mode). For example, the estimated motion vector can be a differential motion vector. The estimated motion vector can be generated using a new motion estimation mode (e.g., different than motion vector modes generated and/or selected by the first predictor component 104) or a split block motion estimation mode (e.g., a motion estimation mode with subpartitions). The estimated motion vector can be selected from one or more motion vectors (e.g., motion estimated motion vectors). Therefore, the estimated motion vector can be a best motion vector (e.g., the motion vector with the lowest SAD cost) from the one or more motion vectors. It is to be appreciated that more than one estimated motion vector can be generated and/or selected. For example, the best three estimated motion vectors (e.g., the three estimated motion vectors with a lowest SAD value) can be generated and/or selected.

The processing component 108 can calculate a distortion value for each of the one or more previous motion vectors, the zero valued motion vector and/or the estimated motion vector. The distortion value can be calculated based at least in part on a SSD calculation. For example, the SSD can be calculated between inter prediction and input data. The distortion (e.g., the SSD computation) can be calculated without chrominance data (e.g., only luminance data can be used to calculate the distortion). The distortion value for each of the one or more previous motion vectors, the zero valued motion vector and the estimated motion vector can be calculated in parallel. The processing component 108 can also calculate and/or determine a rate value for each of the one or more previous motion vectors, the zero valued motion vector and/or the estimated motion vector. Each of the rate values can be fetched (e.g., read) from one or more rate lookup tables. For example, a lambda rate value can be read from a control component (to be described in more detail in FIG. 4). The rate values can be utilized by the processing component 108 without additional processing (e.g., the rate values can be calculated by the control component). Additionally, the processing component 108 can calculate a cost value for each of the one or more previous motion vectors, the zero valued motion vector and/or the estimated motion vector. The cost value can be calculated based at least in part on the calculated distortion and/or the determined rate.

The selector component 110 can select a motion vector with a lowest calculated cost value (e.g., a best motion vector) from the one or more previous motion vectors, the zero valued motion vector and/or the estimated motion vector as an inter frame candidate. Therefore, the best motion vector (e.g., the best candidate) can be provided to a next stage in an encoding process (e.g., intra/inter frame candidate selection). As such, a best motion vector mode (e.g., a motion vector mode with the lowest rate-distortion cost) can be determined.

Using this process, the encoder component 102 can select (or be configured to select) an inter frame candidate for one or more encoded blocks and/or image frames (e.g., ENCODED DATA indicated in FIG. 1).

While FIG. 1 depicts separate components in system 100, it is to be appreciated that the components may be implemented in a common component. For example, the first predictor component 104, the second predictor component 106, the processing component 108 and/or the selector component 110 can be included in a single component. Further, it can be appreciated that the design of system 100 can include other component selections, component placements, etc., to implement inter frame candidate selection. In one example, the first predictor component 104, the second predictor component 106, the processing component 108 and the selector component 110 can be implemented on an ASIC chipset. In another example, the first predictor component 104, the second predictor component 106, the processing component 108 and the selector component 110 can be implemented on a SOC. The first predictor component 104, the second predictor component 106, the processing component 108 and the selector component 110 can be implemented as hardware and/or software. In one example, the first predictor component 104, the second predictor component 106, the processing component 108 and/or the selector component 110 can be implemented as machine-executable component(s) embodied within machine(s), e.g., embodied in one or more computer readable mediums (or media) associated with one or more machines. Such component(s), when executed by the one or more machines, e.g., computer(s), computing device(s), etc. can cause the machine(s) to perform the operations described herein.

Figure 2:
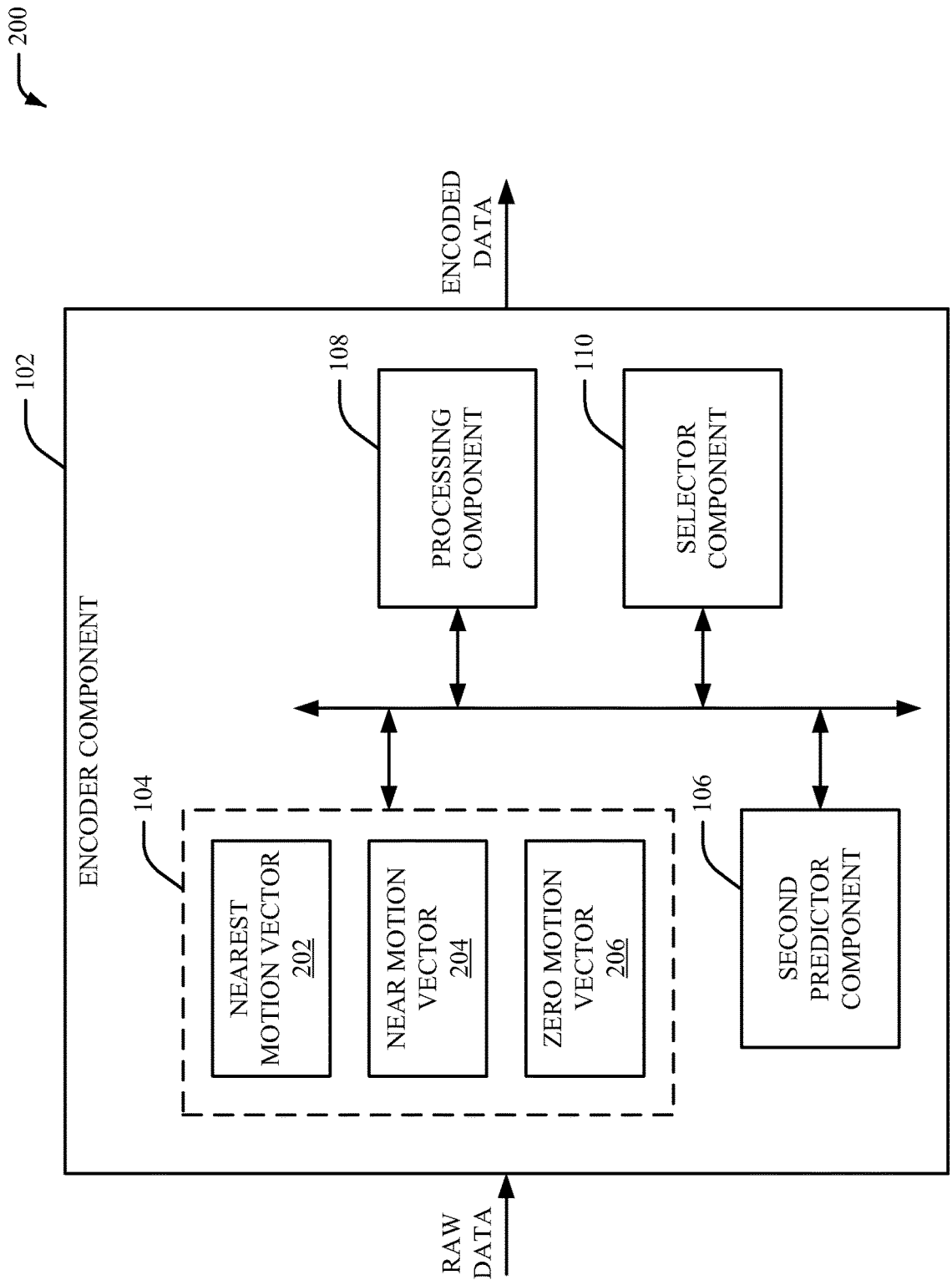
FIG. 2 illustrates a non-limiting implementation of a first predictor component in example encoder component, in accordance with various aspects and implementations described herein.

Referring to FIG. 2, there is illustrated a system 200, according to an aspect of the subject disclosure. The system 200 includes the encoder component 102. The encoder component 102 includes the first predictor component 104, the second predictor component 106, the processing component 108 and the selector component 110. The first predictor component 104 includes a nearest motion vector component 202, a near motion vector component 204 and a zero motion vector component 206.

The nearest motion vector component 202 can generate and/or select a nearest motion vector (e.g., a nearest candidate) from a neighboring macroblock. For example, the nearest motion vector can be the last non-zero motion vector generated by a neighboring macroblock. The nearest motion vector can be generated and/or selected by a motion vector encoding process. In one example, the nearest motion vector can be a 16×16 motion vector.

The near motion vector component 204 can generate and/or select a near motion vector (e.g., a near candidate) from a neighboring macroblock. For example, the near motion vector can be the second-to-last non-zero motion vector generated by the neighboring macroblock. The near motion vector can be generated and/or selected by a motion vector encoding process. In one example, the near motion vector can be a 16×16 motion vector.

The zero motion vector component 206 can generate and/or select a zero valued motion vector (e.g., a motion vector that is zero). The zero valued motion vector can point to a corresponding block in a prediction frame. The zero motion vector can be generated and/or selected by a motion vector encoding process. In one example, the zero motion vector can be a 16×16 motion vector.

The first predictor component 104 can generate and/or select the nearest motion vector, the near motion vector and the zero motion vector (e.g., unique motion vector modes). In one example, the nearest motion vector, the near motion vector and the zero motion vector can be implemented as "special" motion vectors.

Figure 3:
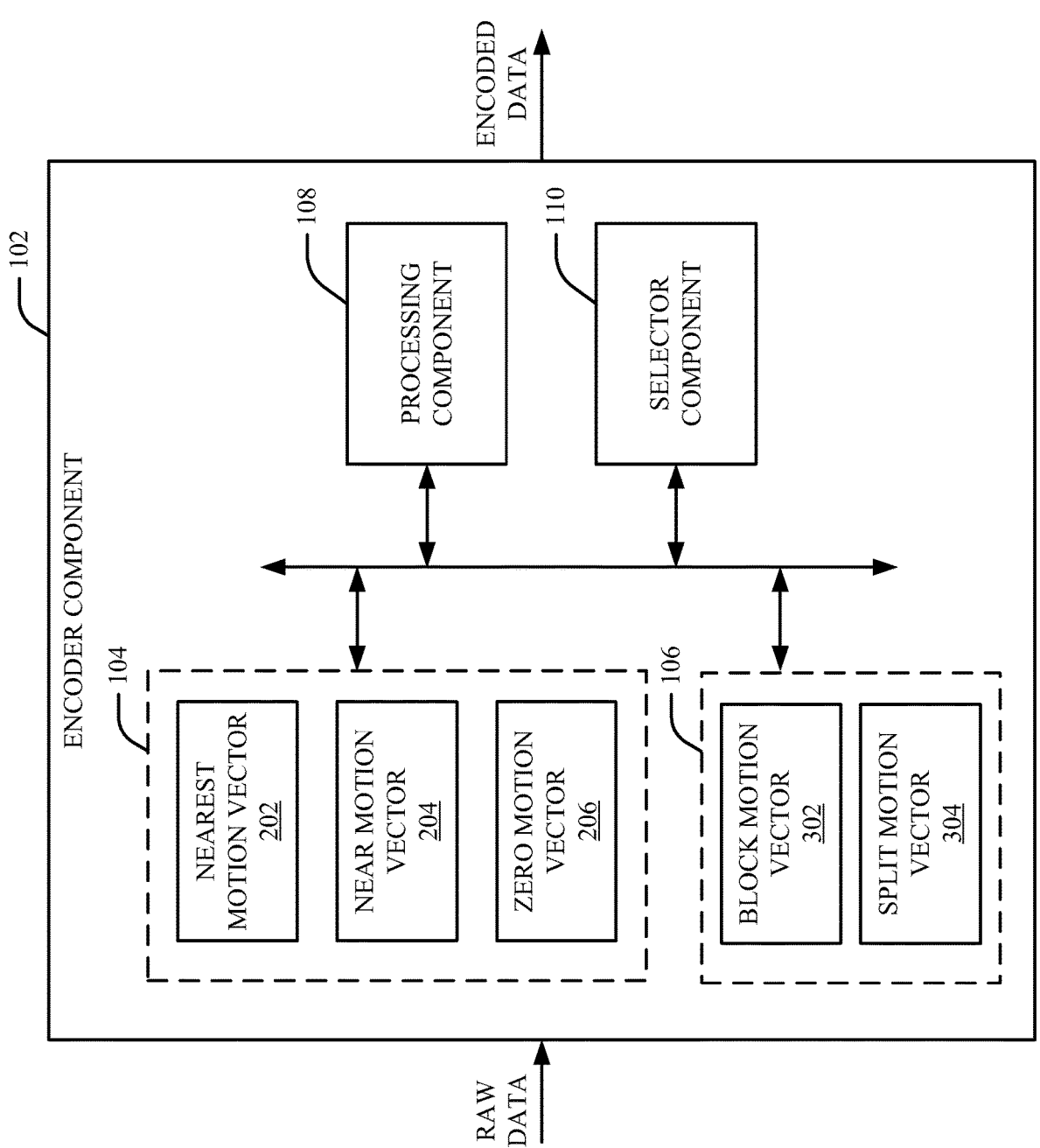
FIG. 3 illustrates a non-limiting implementation of a second predictor component in an example encoder component, in accordance with various aspects and implementations described herein.

Referring to FIG. 3, there is illustrated a system 300, according to an aspect of the subject disclosure. The system 300 includes the encoder component 102. The encoder component 102 includes the first predictor component 104, the second predictor component 106, the processing component 108 and the selector component 110. The first predictor component 104 includes the nearest motion vector component 202, the near motion vector component 204 and the zero motion vector component 206. The second predictor component 106 includes a block motion vector component 302 and a split motion vector component 304. The block motion vector component 302 can generate and/or select a block motion vector. Additionally, the split motion vector component 304 can generate and/or select a split motion vector. The second predictor component 106 can select the block motion vector component 302 or the split motion vector component 304 to implement motion estimation.

The first predictor component 104 can include one or more context values. The context values can be dependent on coding modes and/or motion vectors of neighboring macroblocks. The context values can be used to calculate rate estimations for a particular motion vector mode (e.g., nearest motion vector, near motion vector, zero valued motion vector and/or estimated motion vector). Rate for a particular motion vector mode can be based on the context values. As such, rate (e.g., a cost value) can be based on the approximated number of bits generated by each motion vector mode.

The block motion vector component 302 can implement motion estimation to find a best motion vector (e.g., the block motion vector component 302 can implement a new motion vector mode). For example, the block motion vector component 302 can implement motion estimation to find a 16×16 motion vector. The motion estimation process implemented by the block motion vector component 302 can be based on SAD and/or penalty values (e.g., values based on motion vector length).

The split motion vector component 304 can implement a split motion vector coding mode (e.g., a split motion vector mode for motion estimation). For example, one or more 4×4 subblocks in a 16×16 macroblock can include a unique motion vector (e.g., a 4×4 motion vector). Rate can be calculated based on a partitioning mode and/or sub motion vector modes of individual partitions (e.g., individual subblocks). The split motion vector component 304 can include or access one or more rate lookup tables (e.g., rate constant tables). A rate lookup table can be implemented for split motion vector partitioning. Additionally, a rate lookup table can be implemented for subpartition motion vector reference rates. The rate lookup tables can include one or more constant values (e.g., one or more rate values). The one or more rate values can be relative bit costs based on fixed probabilities. The split motion vector partitioning lookup table can include different rates for different partitioning modes. For example, a 4×4 partitioning mode, an 8×8 partitioning mode, a 16×8 partitioning mode and an 8×16 partitioning mode can each include a unique rate value.

The subpartition motion vector mode rates can be estimated using per-subpartition context. Therefore, the subpartition motion vector lookup table can include different rate values based on context for each subpartition motion vector mode. For example, one or more subpartition motion vector modes can be implemented with different rate values for different context values. Alternatively, the rates for each subpartition motion vector mode can be estimated using weighted averages (e.g., without context values).

The second predictor component 106 can select either the block motion vector or the split motion vector as the estimated motion vector based on, for example, SAD and/or penalty values (e.g., values based on motion vector length). Furthermore, the selector component 110 can select a motion vector with a lowest cost value (e.g., determined by the processing component 108) from the nearest motion vector, the near motion vector, the zero valued motion vector and/or the estimated motion vector (e.g., the block motion vector or the split motion vector) as an inter frame candidate.

Figure 4:
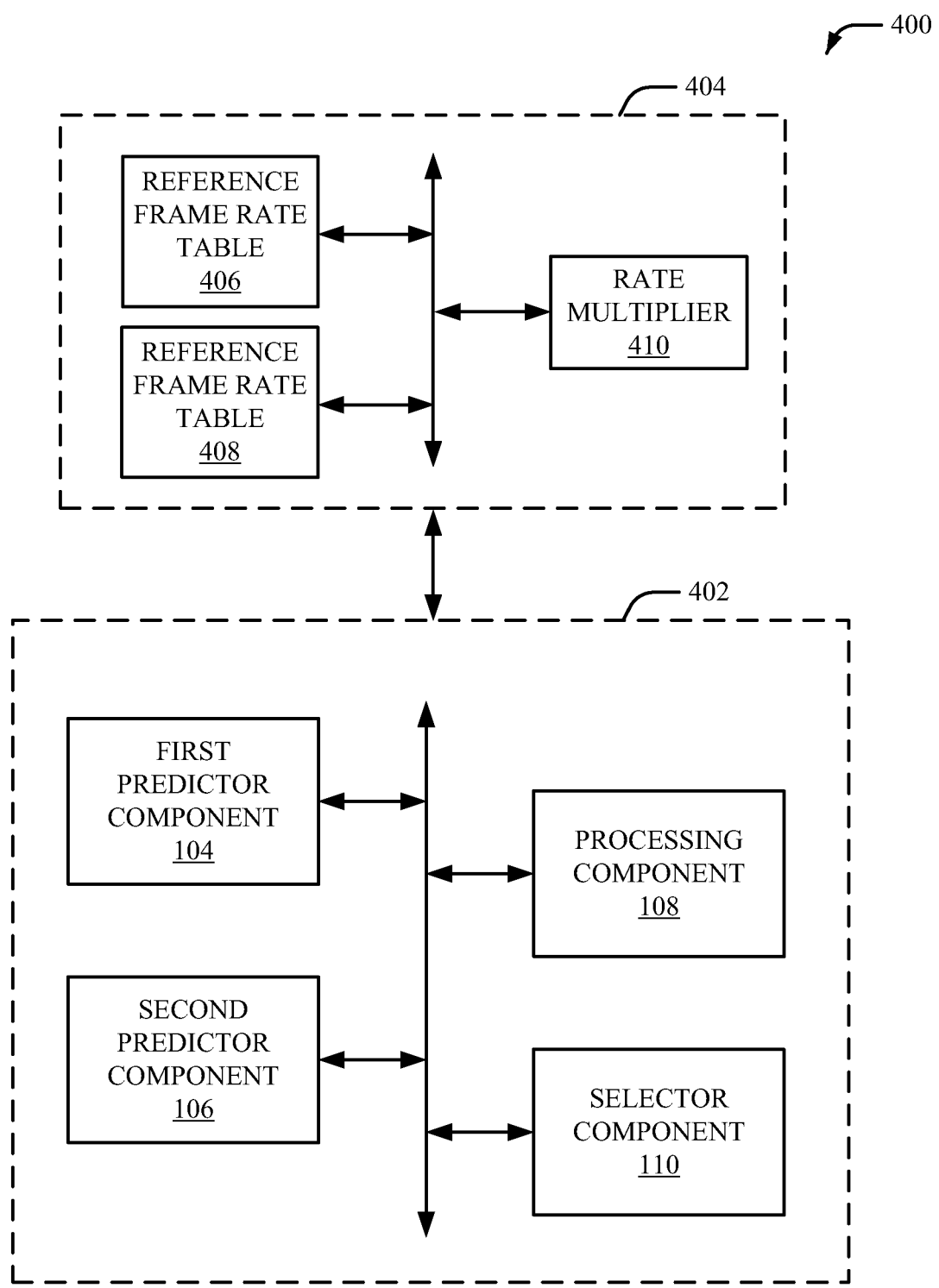
FIG. 4 illustrates a block diagram of an example encoder system, in accordance with various aspects and implementations described herein.

Referring to FIG. 4, there is illustrated an encoder system 400, according to an aspect of the subject disclosure. The encoder system 400 includes an encoder component 402 and a control component 404. The encoder component 402 includes the first predictor component 104, the second predictor component 106, the processing component 108 and the selector component 110. In one example, the encoder component 402 can be implemented as a hardware component. The control component 404 includes a first reference frame rate table 406, a second reference frame rate table 408 and a rate multiplier 410. In one example, the control component 404 can be implemented as a control software component (e.g., a control partition). In another example, the control component 404 can be implemented as a controller (e.g., a microcontroller). In yet another example, the control component 404 can be implemented in a general purpose processor. The control component 404 can generate one or more inputs (e.g., rate for a first reference frame and/or rate for a second reference frame) for the encoder component 402. For example, the control component 404 can provide one or more inputs via a software/hardware interface.

The first reference frame rate table 406 and/or the second reference frame rate table 408 can include (e.g., store) one or more rate values. Values from the first reference frame rate table 206 and/or the second reference frame rate table 408 can be presented to the encoder component 402 in a frame header. The rate values from the first reference frame rate table 406 and/or the second reference frame rate table 408 can include rate values for inter-coded macroblocks. For example, the first reference frame rate table 406 can include rate values for a last inter predicted frame. The second reference frame rate table 408 can include rate values for an arbitrary reference frame. Accordingly, the encoder component 402 can use the rate values to calculate cost for an intra/inter frame candidate decision.

The rate multiplier 410 can provide a rate multiplier for the encoder component 102. For example, the rate multiplier 410 can provide a lambda multiplier. The lambda multiplier can be implemented to calculate cost for the one or more previous motion vectors, the zero valued motion vector and/or the estimated motion vector (e.g., for each motion vector mode).

The processing component 108 can calculate rate and/or distortion for each of the candidates (e.g., each motion vector candidate). Rate generated by encoding differential motion vectors can be approximated per component (e.g., per horizontal component and vertical component). For example, rate per component (Rc) can be calculated using the following equation:

$$Rc=512+64*ABS(c),$$

where c is the motion vector component in ⅛ pixel resolution.

Rate for a motion vector can be calculated by combining horizontal and vertical components. For example, rate for a motion vector (Rmv) can be calculated using the following equation:

$$Rmv=1024+64*(ABS(hor)+ABS(ver)),$$

where hor is the horizontal component and ver is the vertical component in ⅛ pixel resolution.

Additionally, the processing component 108 can calculate a cost value for each candidate (e.g., nearest motion vector, near motion vector, zero valued motion vector, estimated motion vector, etc.). For example, a total rate-distortion (RD) cost can be calculated for each candidate (e.g., each motion vector mode). For example, cost (C) can be calculated using the following equation:

$$C=R*L+D,$$

where R is rate, L is lambda and D is distortion. Lambda (e.g., the rate multiplier) can be provided by the rate multiplier 410. The candidate with a lowest cost value can be selected as a final inter frame candidate (e.g., best inter frame candidate) for the inter/intra frame candidate decision.

Figure 5:
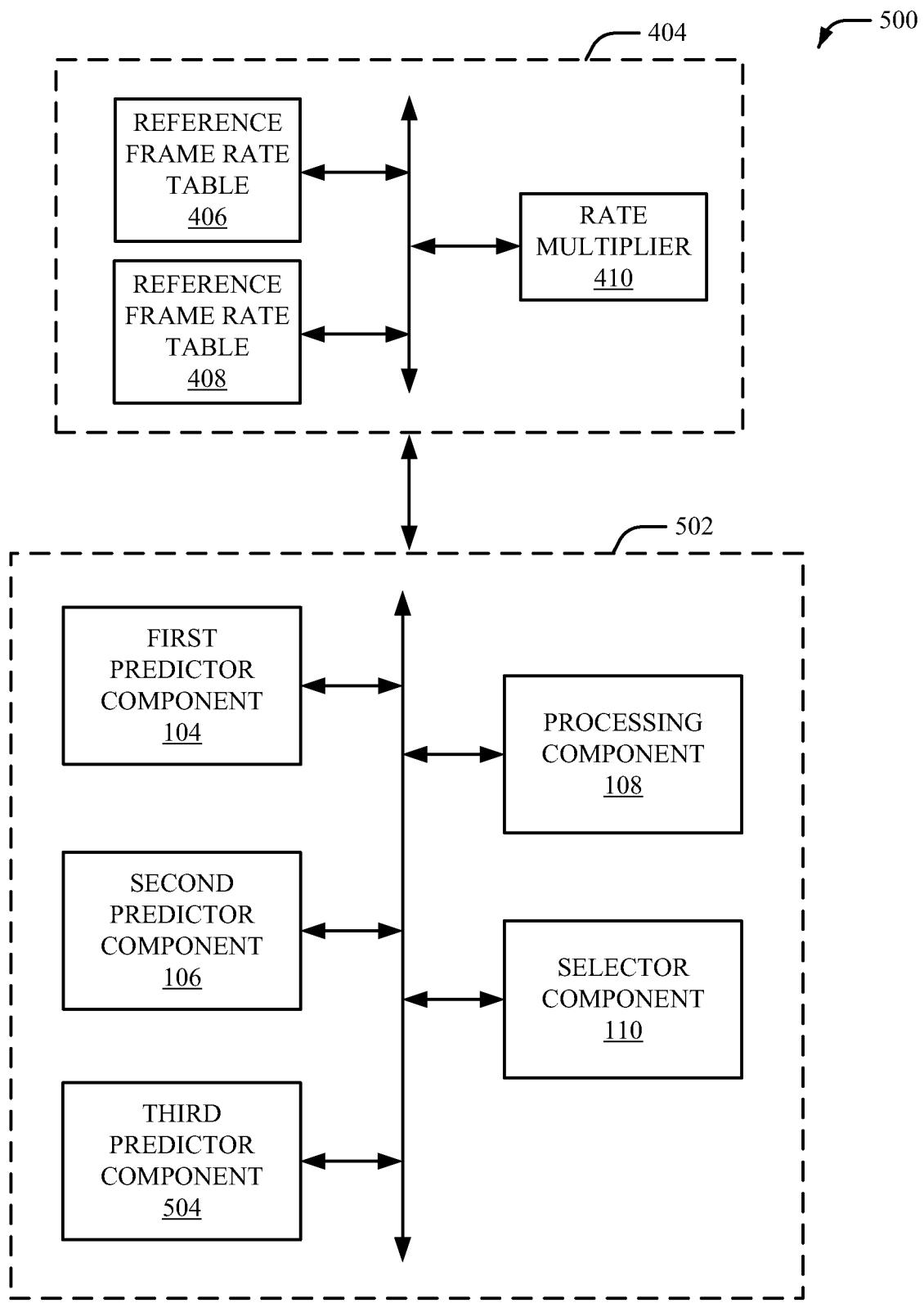
FIG. 5 illustrates a block diagram of a third predictor component in an example encoder system, in accordance with various aspects and implementations described herein.

Referring to FIG. 5, there is illustrated an encoder system 500, according to an aspect of the subject disclosure. The encoder system 500 includes an encoder component 502 and the control component 404. The encoder component 502 includes the first predictor component 104, the second predictor component 106, the processing component 108, the selector component 110 and a third predictor component 504.

The third predictor component 504 can determine an intra frame candidate. The intra frame candidate can be chosen from one or more intra frame candidates (e.g., a particular intra frame candidate can be selected from multiple intra frame candidates). For example, the intra frame candidate can be chosen using intra frame prediction (e.g., using already coded macroblocks within a current frame). Therefore, the chosen intra frame candidate can be a best intra frame candidate.

Figure 6:
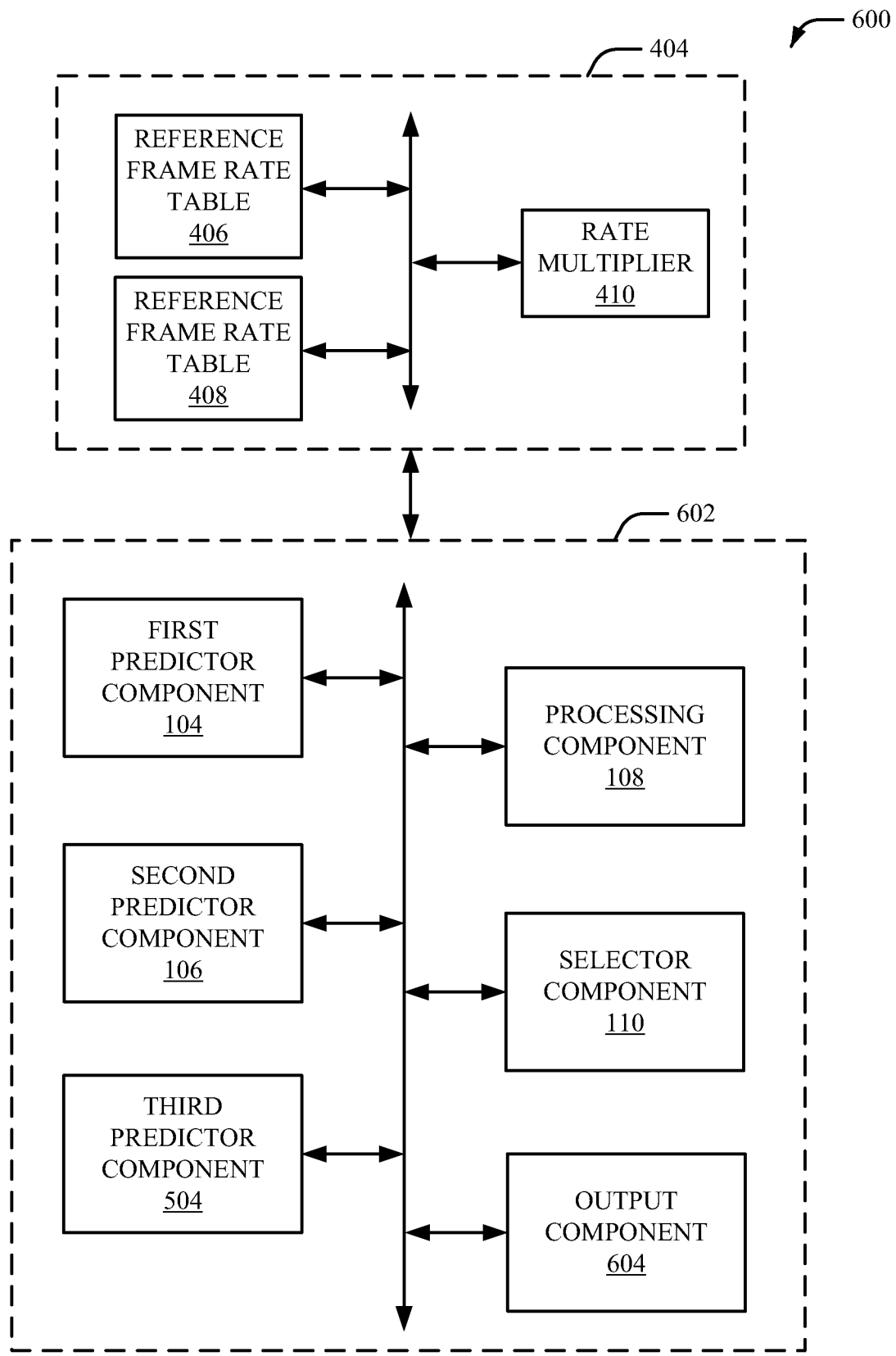
FIG. 6 illustrates a block diagram of an output component in an example encoder system, in accordance with various aspects and implementations described herein.

Referring to FIG. 6, there is illustrated an encoder system 600, according to an aspect of the subject disclosure. The encoder system 600 includes an encoder component 602 and the control component 404. The encoder component 602 includes the first predictor component 104, the second predictor component 106, the processing component 108, the selector component 110, the third predictor component 504 and an output component 604.

The output component 604 can select an inter frame candidate or an intra frame candidate as a motion vector for an output block (e.g., the output component 604 can implement inter/intra frame candidate selection). For example, the output component 604 can select between the inter frame candidate selected by the selector component 110 and the intra frame candidate selected by the third predictor component 504. The candidate selected by the output component 604 can be encoded. The output component 604 can select between an inter frame candidate (e.g., a best inter frame candidate) and an intra frame candidate (e.g., a best intra frame candidate) using a SAD computation and/or a penalty value. For example, SAD can be calculated for the inter frame candidate and/or the intra frame candidate. If the inter frame candidate is associated with a lower SAD value than the intra frame candidate, then the inter frame candidate can be chosen as the motion vector for the output block (e.g., the motion vector for a coded block). However, if the intra frame candidate is associated with a lower SAD value than the inter frame candidate, then the intra frame candidate can be chosen as the motion vector for the output block (e.g., the motion vector for a coded block). If the best inter frame candidate is the estimated motion vector, then the penalty value can be determined based on the motion vector length of the estimated motion vector. However, if the best inter frame candidate is the nearest motion vector, the near motion vector or the zero valued motion vector (e.g., one of the special motion vectors), then the penalty value can be zero.

Figure 7:
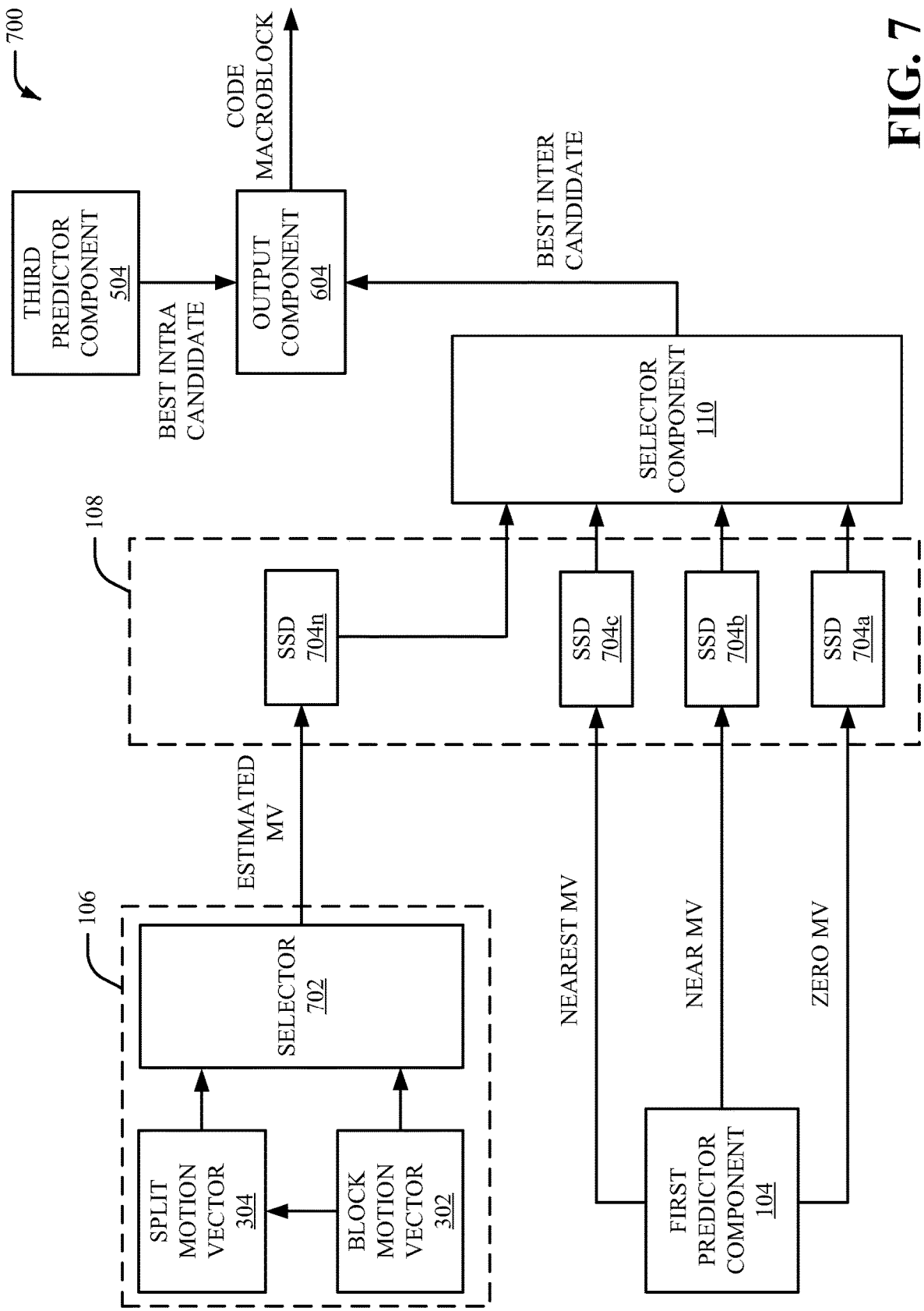
FIG. 7 illustrates a non-limiting implementation for an example encoder system, in accordance with various aspects and implementations described herein.

Referring to FIG. 7, there is illustrated an encoder system 700, according to an aspect of the subject disclosure. The encoder system 700 includes the first predictor component 104, the second predictor component 106, the processing component 108, the selector component 110, the third predictor component 504 and the output component 604. The second predictor component 106 includes the block motion vector component 302, the split motion vector component 304 and a selector component 702. The processing component 108 includes SSD components 704*a-n*.

In the encoder system 700, four separate candidates (e.g., ESTIMATED MV, NEAREST MV, NEAR MV and ZERO MV shown in FIG. 7) can be generated. However, it is to be appreciated that less than four separate candidates (e.g., ESTIMATED MV, NEAREST MV and ZERO MV) can be generated. It is also to be appreciated that more than four separate candidates (e.g., FIRST ESTIMATED MV, SECOND ESTIMATED MV, NEAREST MV, NEAR MV and ZERO MV) can be generated. For example, more than one estimated motion vector can be generated by the second predictor component 106. The first predictor component 104 can implement motion vector encoding to generate and/or select the nearest motion vector, the near motion vector and the zero motion vector. The second predictor component 106 can implement motion estimation to generate and/or select one or more estimated motion vectors.

The second predictor component 106 can find a best estimated motion vector based on a SAD computation and/or one or more penalty values. The best estimated motion vector can be transformed into a split motion vector candidate via the split motion vector component 304. A split motion vector candidate can be tested around a +/−1 pixel area surrounding the best motion vector. The split motion vector component 304 can select and/or generate multiple motion vectors for a single block. For example, a block (e.g., a macroblock) can include one or more subblocks. Therefore, a unique motion vector can be selected and/or generated for each of the one or more subblocks. The selector component 702 can select a candidate from the block motion vector component 302 or the split motion vector component 304 (e.g., the candidate with the lowest SAD and/or penalty can be selected). As such, a best estimated motion vector (e.g., a best motion estimation motion vector) can be selected by the selector component 702.

Each of the motion vectors (e.g., motion vector modes) generated by the first predictor component 104 and the second predictor component 106 can be processed in parallel by the SSD components 704*a-n*. In one example, the SSD components 704*a-n* can be implemented as separate machine-executable components. In another example, the SSD components 704*a-n* can be implemented as separate hardware components. In yet another example, the SSD components 704*a-n* can be implemented as a combination of hardware and software. Each of the SSD components 704*a-n* can measure distortion for a motion vector using a SSD computation. Additionally, the processing component 108 can measure rate for a motion vector by approximating the number of bits included in the bitstream for each motion vector.

The selector component 110 can select a motion vector (e.g., a motion vector mode) with a lowest cost value (e.g., a lowest rate-distortion cost value). The motion vector with the lowest cost value can be selected as the best inter frame candidate. For example, the selector component 110 can select the nearest motion vector, the near motion vector, the zero valued motion vector or the estimated motion vector (e.g., the block motion vector or the split motion vector) as the best inter frame candidate. As such, motion estimation can skip preference for zero, nearest and near motion vectors (e.g., a new motion vector can be encoded instead). The third predictor component 504 can generate and/or select a best intra frame candidate. The best intra frame candidate can be determined based on intra frame prediction. The output component 604 can select the best inter frame candidate or the best intra frame candidate based on a SAD computation and/or a penalty value. The output component can then encode the selected candidate (e.g., the best inter frame candidate or the best intra frame candidate). As such, SSD can be implemented for inter frame candidate selection and SAD can be implemented for inter/intra frame candidate selection.

While implementations and aspects of this disclosure are described herein with regard to blocks, this disclosure is not so limited. For example, the implementations and aspects disclosed herein in relation to blocks can be used (e.g., applied) in relation to various types of units or regions of a video frame, such as, for example, macroblocks, sub-macroblocks, coding units, motion granularity units, partitions, and/or other types of image compression units, and these various types of image compression units are within the scope of this disclosure.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
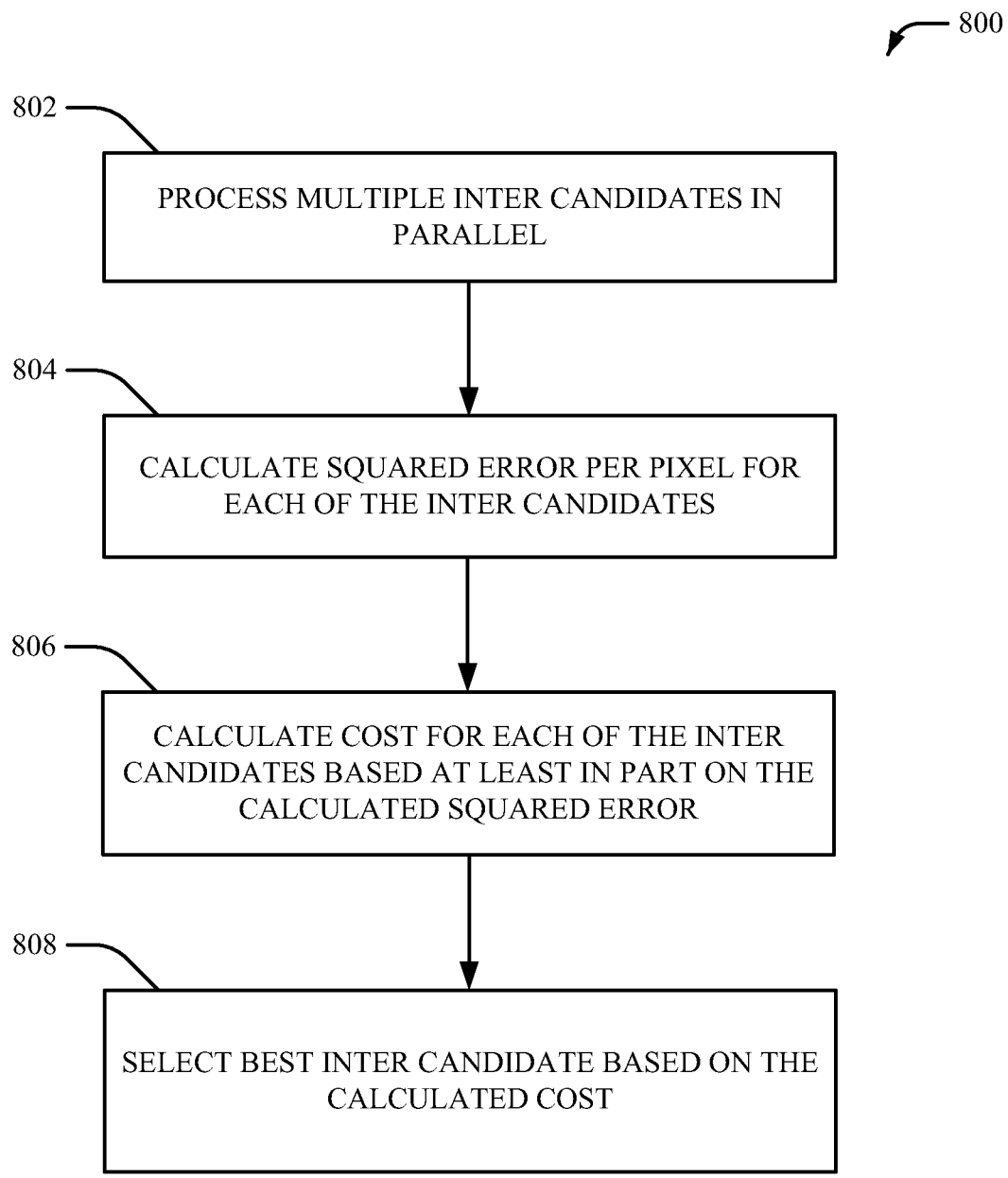
FIG. 8 depicts a flow diagram of an example method for selecting an inter frame candidate, in accordance with various aspects and implementations described herein.
Figure 9:
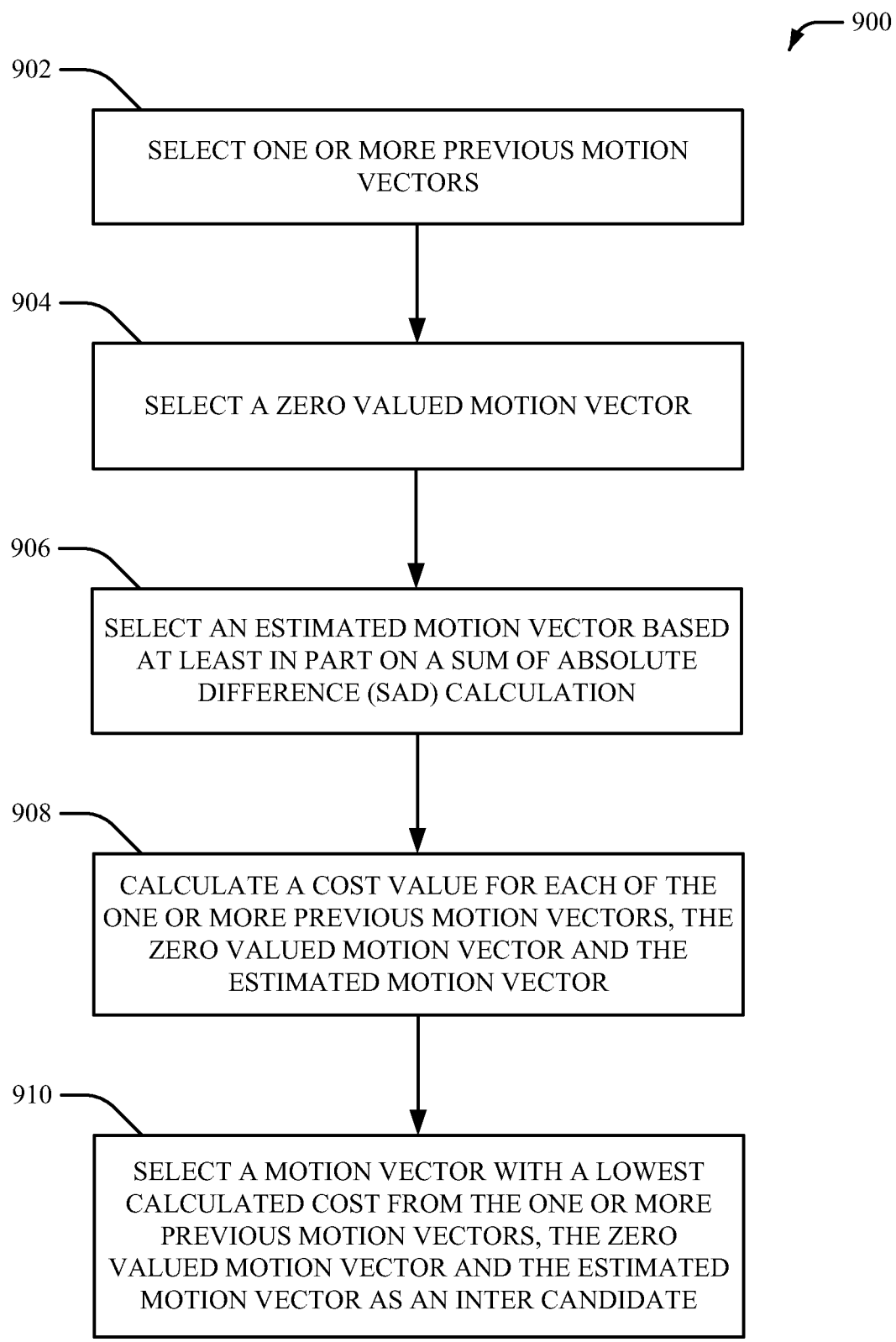
FIG. 9 depicts a flow diagram of another example method for selecting an inter frame candidate, in accordance with various aspects and implementations described herein.
Figure 10:
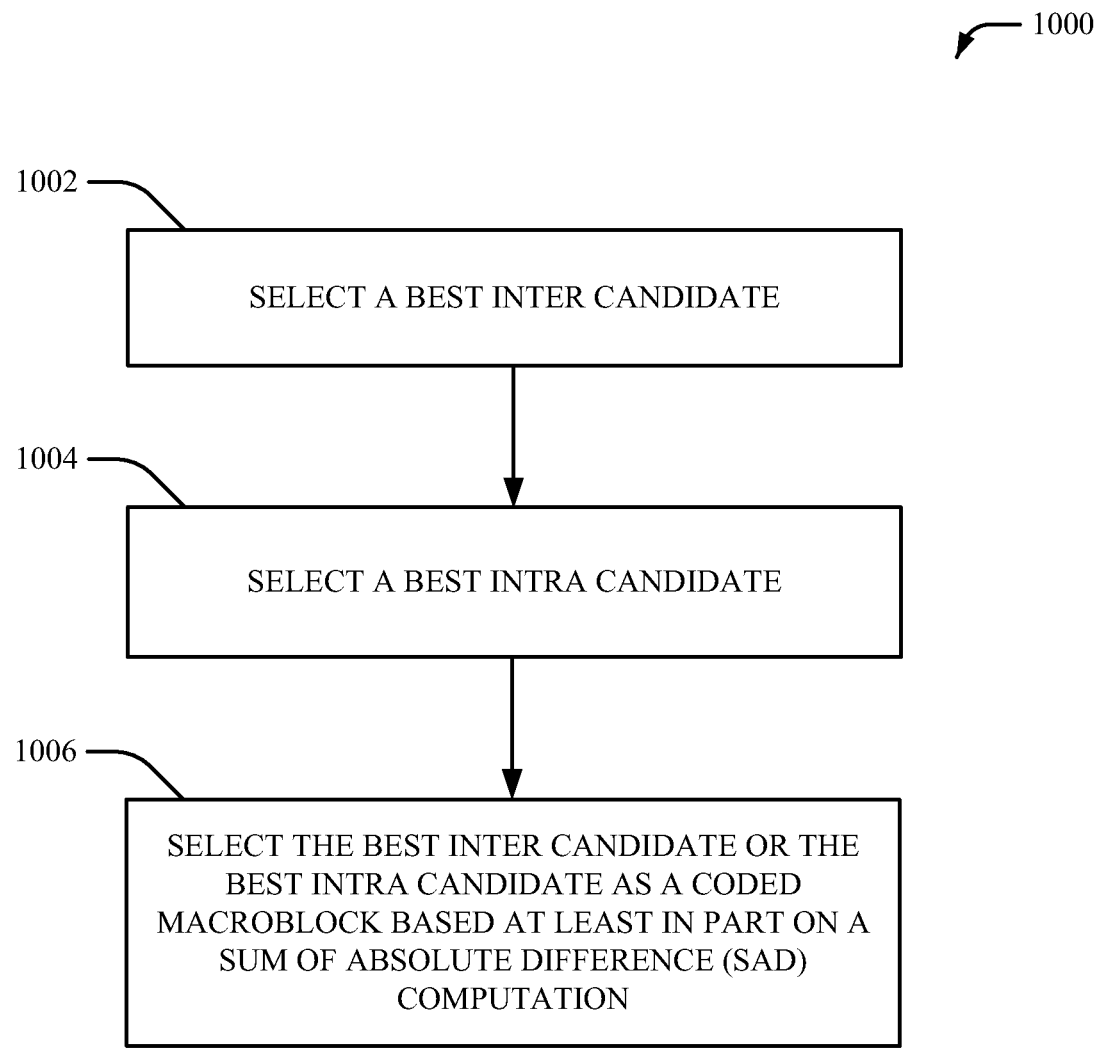
FIG. 10 depicts a flow diagram of an example method for selecting an inter frame candidate or an intra frame candidate for encoding, in accordance with various aspects and implementations described herein.

FIGS. 8-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media. The storage media can include non-transitory memory devices, e.g., memory devices that are used for long term persistent storage. Examples of non-transitory memory devices include random access memory, hard disks and flash memory devices Referring to FIG. 8, there illustrated is a methodology 800 for selecting an inter frame candidate, according to an aspect of this disclosure. As an example, methodology 800 can be utilized in various encoding applications, such as, but not limited to, media capturing systems, media displaying systems, computing devices, mobile phones, tablets, personal data assistants (PDAs), laptops, personal computers, audio/video devices, etc. Specifically, the methodology 800 can select an inter frame candidate based on rate-distortion cost of inter frame candidates.

Initially, video information can be captured or can be contained within memory (e.g., within a buffer). At 802, multiple inter frame candidates can be processed (e.g., using a processing component 108) in parallel. For example, a nearest motion vector, a near motion vector, a zero valued motion vector and/or one or more estimated motion vectors (e.g., various motion vector modes) can be processed in parallel. At 804, a squared error per pixel for each of the inter frame candidates can be calculated (e.g., using a processing component 108). For example, distortion for each of the inter frame candidates can be calculated using a SAD operation for pixels in each of the inter frame candidates (e.g., for each motion vector mode). At 806, cost for each of the inter frame candidates can be calculated (e.g., using a processing component 108) based at least in part on the calculated squared error. For example, cost for a particular inter frame candidate (e.g., a particular motion vector mode) can be calculated based on distortion (e.g., SAD) and rate. At 808, a best inter frame candidate can be selected (e.g., using a selector component 110) from the multiple inter frame candidates based on the calculated cost. For example, an inter frame candidate (e.g., a motion vector mode) with a lowest calculated cost value can be selected as the best inter frame candidate.

Referring to FIG. 9, there illustrated is a methodology 900 for selecting an inter frame candidate based on measured SSD. At 902, one or more previous motion vectors can be selected (e.g., using a first predictor component 104). For example, one or more previously determined motion vectors from a neighboring block in a current frame can be selected. At 904, a zero valued motion vector can be selected (e.g., using a first predictor component 104). For example, a motion vector that predicts a current block from a corresponding block in a prediction frame (e.g., with zero offset) can be selected. At 906, an estimated motion vector can be selected (e.g., using a second predictor component 106) based at least in part on a sum of absolute difference (SAD) calculation and a penalty value. For example, a new motion vector can be generated and/or selected using motion estimation. At 908, a cost value can be calculated (e.g., using a processing component 108) for each of the one or more previous motion vectors, the zero valued motion vector and the estimated motion vector. For example, a cost value can be calculated for each of the one or more previous motion vectors, the zero valued motion vector and the estimated motion vector based at least in part on a sum of squared difference (SSD) calculation. At 910, a motion vector with a lowest calculated cost can be selected (e.g., using a selector component 110) from the one or more previous motion vectors, the zero valued motion vector and the estimated motion vector as an inter frame candidate. For example, a motion vector with a lowest calculated cost based on SSD and rate can be selected from the one or more previous motion vectors, the zero valued motion vector and the estimated motion vector as an inter frame candidate.

Referring to FIG. 10, there illustrated is a methodology 1000 for selecting an inter frame candidate or an intra frame candidate. At 1002, a best inter frame candidate can be selected (e.g., using an encoder component 102). For example, the methodology 900 can be implemented at 1002. At 1004, a best intra frame candidate can be selected (e.g., using a third predictor component 504). For example, an intra frame candidate can be selected using intra frame prediction. At 1006, the best inter frame candidate or the best intra frame candidate can be selected (e.g., using an output component 604) as a coded macroblock based at least in part on a sum of absolute difference (SAD) computation. For example, SAD can be calculated for the best inter frame candidate and the best intra frame candidate. If the best inter frame candidate has a lower SAD value than the best intra frame candidate, then the best inter frame candidate can be encoded. However, if the best intra frame candidate has a lower SAD value than the best inter frame candidate, then the best intra frame candidate can be encoded.

In some implementations, calculating, such as by the processing component 108, the cost value for each candidate, such as the nearest motion vector, the near motion vector, the zero valued motion vector, or the estimated motion vector, may include generating a residual block for the current block. For example, the residual block may be generated as a difference between the input block and the predicted block.

In some implementations, a transform block may be generated from the residual block, which may include transform coefficients. For example, the residual block may be transformed using, for example, a discrete cosign transform (DCT). In some implementations, the size of the transform may correspond with the size of the residual block. For example, the residual block may be a 64×64 block and may be transformed using a 64×64 transform. In some implementations, the size of the transform may be smaller than the size of the residual block. For example, the residual block may be a 64×64 block and the residual block may be transformed using multiple smaller transforms, such as four 32×32 transforms. Other, smaller, transform sizes, or combinations thereof, may be used.

In some implementations, a quantized block may be generated from the transform block. For example, the transform coefficients from the transform block may be quantized. In some implementations, the quantization may be based on a defined quantization value. In some implementations, an inverse-quantized block may be generated from the quantized block. For example, the quantized transform coefficients from the quantized transform block may be inverse-quantized. In some implementations, the inverse-quantization may be based on a defined inverse-quantization value.

In some implementations, a distortion measurement ($C_0$), such as a sum of squared errors, may be generated based on the transform coefficients from the transform block and the inverse-transform coefficients from the inverse-transform block.

In some implementations, an array of quantized coefficients (A(n)) may be generated from the quantization block. For example, the quantized coefficients from the quantization block may be included in the array in a defined scan order. In some implementations, the scan order may be determined based on, for example, the transform size.

In some implementations, an estimated encoding cost ($C_1$) may be determined for each coefficient from the array of quantized coefficients (A(n)). Determining the encoding cost may include using a defined conversion table (B(n)), which may be based on, for example, the transform size, and may be expressed as $C_1 = \Sigma_{i=0}^{M*N} B(A(i))$.

In some implementations, the cost value (C) for each candidate may be determined based on the first distortion measurement ($C_0$) and the second distortion measurement ($C_1$). In some implementations, the determining the cost value may include using a defined weight (L). For example, the cost value may be determined as the sum of the first distortion measurement ($C_0$) and the product of the second distortion measurement ($C_1$) and the weight (L), and may be expressed as $C = C_0 + L*C_1$.

Figure 11:
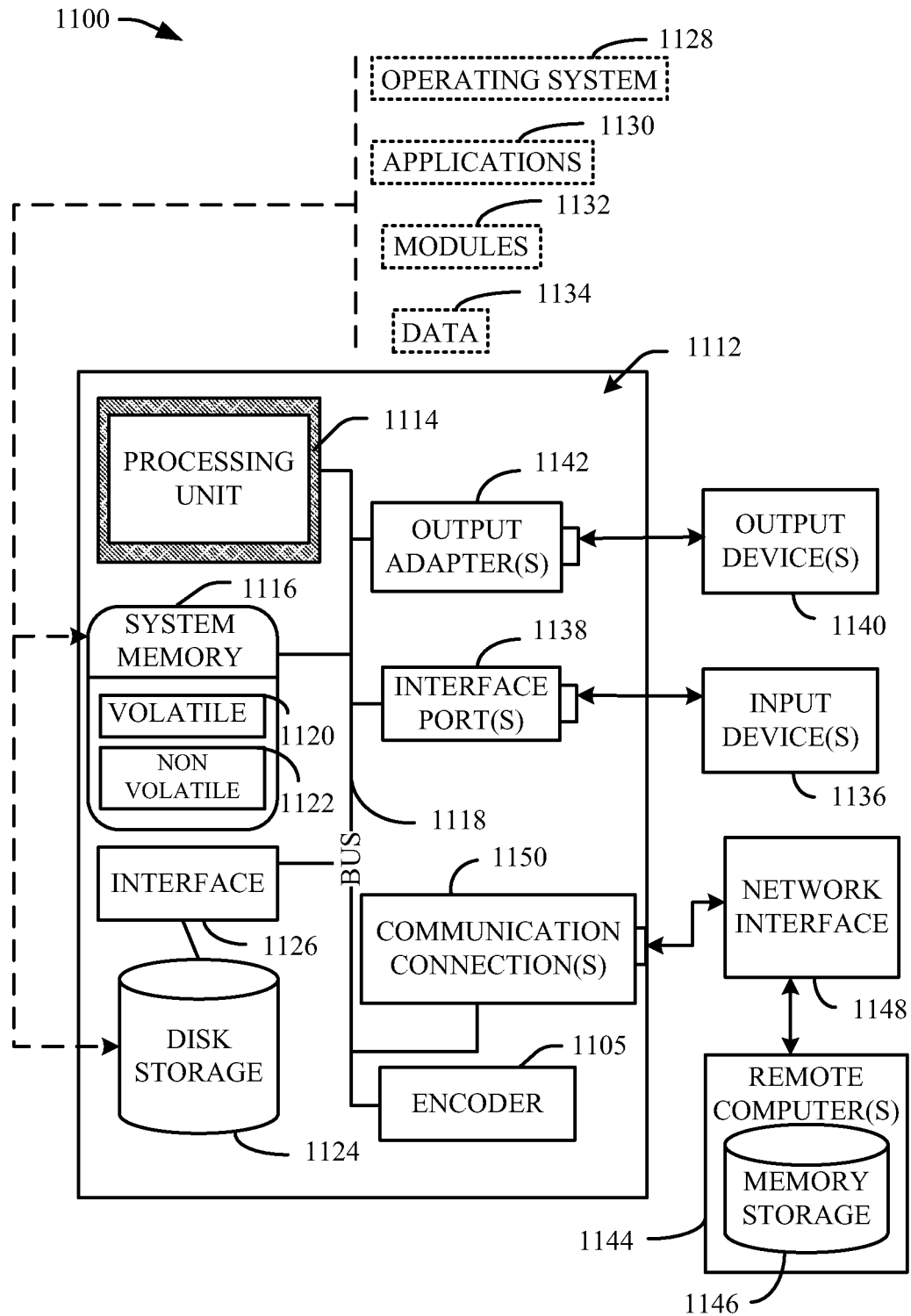
FIG. 11 is a schematic block diagram illustrating a suitable operating environment.
Figure 12:
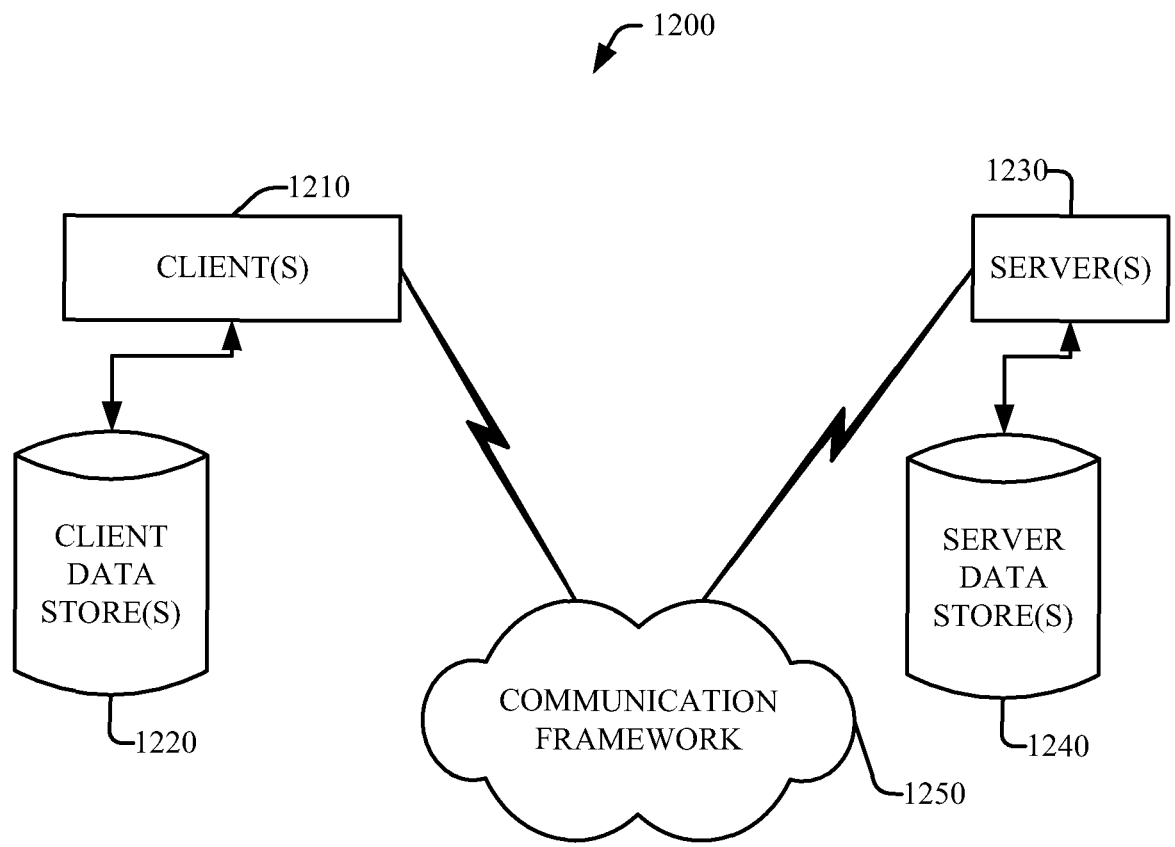
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 can include, but is not limited to, devices like a magnetic disk drive, floppy disk drive, flash drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

In accordance with various aspects and implementations, the computer 1112 can be used to encode data, such as digital media data, which can be in the form of a sequence of video frames (e.g., raw video frames). In some implementations, the computer 1112 can include a plurality of processors that can be used to process data and perform computing tasks (e.g., encoding-related tasks and/or decoding-related tasks, etc.). The computer 1112 includes an encoder 1105 that can contain, for example, an encoder component (e.g., the encoder component 102, the encoder system 400, the encoder system 500, the encoder system 600, the encoder system 700), which can function as more fully disclosed herein. In some implementations, the encoder 1105 can perform various encoding tasks (e.g., generating motion estimations and motion vectors, encoding blocks and associated motion vectors, determining whether to reuse a prior encoded motion vector to encode a current block, identifying a coding mode associated with a current block, allocating bits for encoding of a current block, etc.) on data (e.g., sequentially or in parallel). The components of the encoder 1105 can be implemented as hardware, software and/or firmware. For example, the encoder 1105 can include one or more computer executable components. In one example, the computer 1112 and/or the encoder 1105 can be implemented as an ASIC chip. In another example, the computer 1112 and/or the encoder 1105 can be implemented as a SOC. It is to be appreciated that the computer 1112 can be used in connection with implementing one or more of the systems or components shown and described in connection with FIGS. 1-7.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, tablets), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "generate," "generating," or forms thereof may be or include forming, identifying or otherwise determining, as may be logical based on the particular description.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A method, comprising:
identifying a current block from a current input frame from an input video stream;
generating, by a processor in response to instructions stored on a non-transitory computer readable medium, an encoded block by encoding the current block, wherein encoding the current block includes determining an inter-coding candidate motion vector, wherein determining the inter-coding candidate motion vector includes:
identifying a plurality of motion vectors, wherein the plurality of motion vectors includes a context motion vector identified from a block neighboring the current block in the current input frame, a zero valued motion vector, and an estimated motion vector based on the current block and a reference frame,
determining a plurality of cost values by determining a cost value for each respective motion vector from the plurality of motion vectors, wherein determining the cost value for a motion vector from the plurality of motion vectors includes:
determining a distortion measurement for encoding the current block using the motion vector;
determining an estimated encoding cost for encoding the current block using the motion vector;
identifying a weighting value; and
determining the cost value as a sum of the distortion measurement and a product of the weighting value and the estimated encoding cost, and
identifying a motion vector from the plurality of motion vectors having a minimal cost value as the inter-coding candidate motion vector;
including the encoded block in an output bitstream; and
storing or transmitting the output bitstream.

2. The method of claim 1, wherein identifying the plurality of motion vectors includes generating the estimated motion vector, wherein generating the estimated motion vector includes:
generating a first candidate estimated motion vector based on the current block;
generating a second candidate estimated motion vector based on a first sub-block of the current block;
generating a third candidate estimated motion vector based on a second sub-block of the current block;
determining a first motion estimation cost value as a sum of a first penalty value and sum of absolute differences for the first candidate estimated motion vector;
determining a second motion estimation cost value as a sum of a second penalty value and sum of absolute differences for the second candidate estimated motion vector and the third candidate estimated motion vector;
selecting the first candidate estimated motion vector as the estimated motion vector on a condition that the second motion estimation cost value exceeds the first motion estimation cost value; and
selecting the second candidate estimated motion vector as the estimated motion vector on a condition that the first motion estimation cost value exceeds the second motion estimation cost value.

3. The method of claim 1, wherein identifying the motion vector from the plurality of motion vectors having the minimal cost value as the inter-coding candidate motion vector includes:
selecting the context motion vector as the inter-coding candidate motion vector on a condition that the cost value associated with the zero valued motion vector exceeds the cost value associated with the context motion vector and the cost value associated with the estimated motion vector exceeds the cost value associated with the context motion vector;

selecting the zero valued motion vector as the inter-coding candidate motion vector on a condition that the cost value associated with the context motion vector exceeds the cost value associated with the zero valued motion vector and the cost value associated with the estimated motion vector exceeds the cost value associated with the zero valued motion vector;

selecting the estimated motion vector as the inter-coding candidate motion vector on a condition that the cost value associated with the zero valued motion vector exceeds the cost value associated with the estimated motion vector and the cost value associated with the context vector exceeds the cost value associated with the estimated motion vector.

4. The method of claim 1, wherein determining the cost value for the motion vector from the plurality of motion vectors includes:

determining a predicted block based on the current block and the motion vector;

determining a residual block as a difference between the current block and the predicted block;

generating a transform block based on the residual block; and generating a quantized block based on the transform block.

5. The method of claim 4, wherein determining the distortion measurement for encoding the current block using the motion vector includes:

determining an inverse-quantized block based on the quantized block;

determining a sum of squared errors between the transform block and the inverse-quantized block as the distortion measurement.

6. The method of claim 4, wherein determining the estimated encoding cost for encoding the current block using the motion vector includes:

identifying a defined scan order for the quantized block, wherein the quantized block includes a plurality of quantized transform coefficients;

determining a plurality of estimated coefficient encoding costs by determining an estimated coefficient encoding cost for each respective quantized transform coefficient from the plurality of quantized transform coefficients; and determining a sum of the plurality of estimated coefficient encoding costs as the estimated encoding cost.

7. The method of claim 1, wherein encoding the current block includes determining an intra-coding candidate motion vector.

8. The method of claim 7, wherein encoding the current block includes:

determining a first sum of absolute differences for the intra-coding candidate motion vector;

determining a second sum of absolute differences for the inter-coding candidate motion vector;

encoding the current block using the intra-coding candidate motion vector on a condition that the second sum of absolute differences exceeds the first sum of absolute differences; and encoding the current block using the inter-coding candidate motion vector on a condition that the first sum of absolute differences exceeds the second sum of absolute differences.

9. The method of claim 1, wherein determining plurality of cost values includes determining each cost value from the plurality of cost values in parallel.

10. The method of claim 1, wherein identifying the context motion vector includes identifying the context motion vector such that the context motion vector is a non-zero motion vector.

11. The method of claim 1, wherein identifying the context motion vector includes identifying the context motion vector from the block neighboring the current block in the current input frame on a condition that the block neighboring the current block in the current input frame is a previously coded block encoded using the context motion vector.

12. The method of claim 1, wherein determining the inter-coding candidate motion vector includes:

identifying a second context motion vector from a second block neighboring the current block in the current input frame.

13. The method of claim 12, wherein identifying the second context motion vector includes identifying the second context motion vector such that the second context motion vector is a non-zero motion vector.

14. The method of claim 13, wherein identifying the second context motion vector includes identifying the second context motion vector from the second block neighboring the current block in the current input frame on a condition that the second block neighboring the current block in the current input frame is a previously coded block encoded using the second context motion vector.

15. A method, comprising:

identifying a current block from a current input frame from an input video stream;

generating, by a processor in response to instructions stored on a non-transitory computer readable medium, an encoded block by encoding the current block, wherein encoding the current block includes determining an inter-coding candidate motion vector, wherein determining the inter-coding candidate motion vector includes:

identifying a plurality of motion vectors, wherein the plurality of motion vectors includes a context motion vector identified from a block neighboring the current block in the current input frame, a zero valued motion vector, and an estimated motion vector based on the current block and a reference frame, determining a plurality of cost values by determining a cost value for each respective motion vector from the plurality of motion vectors, wherein determining the cost value for a motion vector from the plurality of motion vectors includes:

determining a predicted block based on the current block and the motion vector;

determining a residual block as a difference between the current block and the predicted block;

generating a transform block based on the residual block;

generating a quantized block based on the transform block;

determining an inverse-quantized block based on the quantized block;

determining a sum of squared errors between the transform block and the inverse-quantized block as a distortion measurement for encoding the current block using the motion vector;

identifying a defined scan order for the quantized block, wherein the quantized block includes a plurality of quantized transform coefficients;

determining a plurality of estimated coefficient encoding costs by determining an estimated coefficient encoding cost for each respective quantized transform coefficient from the plurality of quantized transform coefficients;

determining a sum of the plurality of estimated coefficient encoding costs as an estimated encoding cost for encoding the current block using the motion vector;

identifying a weighting value; and determining the cost value as a sum of the distortion measurement and a product of the weighting value and the estimated encoding cost, and identifying a motion vector from the plurality of motion vectors having a minimal cost value as the inter-coding candidate motion vector;

including the encoded block in an output bitstream; and storing or transmitting the output bitstream.

16. The method of claim 15, wherein identifying the plurality of motion vectors includes generating the estimated motion vector, wherein generating the estimated motion vector includes:

generating a first candidate estimated motion vector based on the current block;

generating a second candidate estimated motion vector based on a first sub-block of the current block;

generating a third candidate estimated motion vector based on a second sub-block of the current block;

determining a first motion estimation cost value as a sum of a first penalty value and sum of absolute differences for the first candidate estimated motion vector;

determining a second motion estimation cost value as a sum of a second penalty value and sum of absolute differences for the second candidate estimated motion vector and the third candidate estimated motion vector;

selecting the first candidate estimated motion vector as the estimated motion vector on a condition that the second motion estimation cost value exceeds the first motion estimation cost value; and selecting the second candidate estimated motion vector as the estimated motion vector on a condition that the first motion estimation cost value exceeds the second motion estimation cost value.

17. The method of claim 15, wherein identifying the motion vector from the plurality of motion vectors having the minimal cost value as the inter-coding candidate motion vector includes:

selecting the context motion vector as the inter-coding candidate motion vector on a condition that the cost value associated with the zero valued motion vector exceeds the cost value associated with the context motion vector and the cost value associated with the estimated motion vector exceeds the cost value associated with the context motion vector;

selecting the zero valued motion vector as the inter-coding candidate motion vector on a condition that the cost value associated with the context motion vector exceeds the cost value associated with the zero valued motion vector and the cost value associated with the estimated motion vector exceeds the cost value associated with the zero valued motion vector;

selecting the estimated motion vector as the inter-coding candidate motion vector on a condition that the cost value associated with the zero valued motion vector exceeds the cost value associated with the estimated motion vector and the cost value associated with the context vector exceeds the cost value associated with the estimated motion vector.

18. The method of claim 15, wherein encoding the current block includes:

determining an intra-coding candidate motion vector;

determining a first sum of absolute differences for the intra-coding candidate motion vector;

determining a second sum of absolute differences for the inter-coding candidate motion vector;

encoding the current block using the intra-coding candidate motion vector on a condition that the second sum of absolute differences exceeds the first sum of absolute differences; and encoding the current block using the inter-coding candidate motion vector on a condition that the first sum of absolute differences exceeds the second sum of absolute differences.

19. The method of claim 15, wherein determining plurality of cost values includes determining each cost value from the plurality of cost values in parallel.

20. A method, comprising:

identifying a current block from a current input frame from an input video stream;

generating, by a processor in response to instructions stored on a non-transitory computer readable medium, an encoded block by encoding the current block, wherein encoding the current block includes:

determining an inter-coding candidate motion vector, wherein determining the inter-coding candidate motion vector includes:

identifying a plurality of motion vectors, wherein the plurality of motion vectors includes a context motion vector identified from a block neighboring the current block in the current input frame, a zero valued motion vector, and an estimated motion vector based on the current block and a reference frame;

determining a plurality of cost values by determining a cost value for each respective motion vector from the plurality of motion vectors, wherein determining the cost value for a motion vector from the plurality of motion vectors includes:

determining a distortion measurement for encoding the current block using the motion vector, determining an estimated encoding cost for encoding the current block using the motion vector, identifying a weighting value, and determining the cost value as a sum of the distortion measurement and a product of the weighting value and the estimated encoding cost; and identifying a motion vector from the plurality of motion vectors having a minimal cost value as the inter-coding candidate motion vector, determining an intra-coding candidate motion vector, determining a first sum of absolute differences for the intra-coding candidate motion vector, determining a second sum of absolute differences for the inter-coding candidate motion vector, encoding the current block using the intra-coding candidate motion vector on a condition that the second sum of absolute differences exceeds the first sum of absolute differences, and encoding the current block using the inter-coding candidate motion vector on a condition that the first sum of absolute differences exceeds the second sum of absolute differences;

including the encoded block in an output bitstream; and storing or transmitting the output bitstream.

* * * * *